(12) United States Patent
Agrawal et al.

(10) Patent No.: US 9,740,074 B2
(45) Date of Patent: Aug. 22, 2017

(54) ELECTROCHROMIC MIRRORS AND OTHER ELECTROOPTIC DEVICES

(71) Applicants: Anoop Agrawal, Tucson, AZ (US); Juan Carlos Lopez Tonazzi, Tucson, AZ (US); John P. Cronin, Tucson, AZ (US)

(72) Inventors: Anoop Agrawal, Tucson, AZ (US); Juan Carlos Lopez Tonazzi, Tucson, AZ (US); John P. Cronin, Tucson, AZ (US)

(73) Assignee: AJJER LLC, Tucson, AZ (US)

( * ) Notice: Subject to any disclaimer, the term of this patent is extended or adjusted under 35 U.S.C. 154(b) by 0 days.

(21) Appl. No.: 14/530,792

(22) Filed: Nov. 2, 2014

(65) Prior Publication Data

US 2016/0282695 A1    Sep. 29, 2016

Related U.S. Application Data

(60) Continuation of application No. 13/084,430, filed on Apr. 11, 2011, now Pat. No. 8,947,758, which is a division of application No. 12/781,699, filed on May 17, 2010, now Pat. No. 8,599,466, which is a division of application No. 11/927,462, filed on Oct. 29, 2007, now Pat. No. 7,738,155, which is a division of application No. 10/793,071, filed on Mar. 4, 2004, now Pat. No. 7,300,166.

(60) Provisional application No. 60/452,332, filed on Mar. 5, 2003, provisional application No. 60/502,781, filed on Sep. 12, 2003, provisional application No. 60/531,463, filed on Dec. 19, 2003.

(51) Int. Cl.
| | |
|---|---|
| *G02F 1/161* | (2006.01) |
| *B60R 1/08* | (2006.01) |
| *C09K 9/02* | (2006.01) |
| *C09J 163/00* | (2006.01) |
| *G02F 1/15* | (2006.01) |

(52) U.S. Cl.
CPC ............. *G02F 1/161* (2013.01); *B60R 1/088* (2013.01); *C09J 163/00* (2013.01); *C09K 9/02* (2013.01); *G02F 1/1525* (2013.01); *Y10T 29/49002* (2015.01)

(58) Field of Classification Search
CPC ........ C09J 163/00; G02F 1/161; G02F 1/153; B60R 1/088
See application file for complete search history.

(56) References Cited

U.S. PATENT DOCUMENTS

| | | | | |
|---|---|---|---|---|
| 5,790,298 A | * | 8/1998 | Tonar | G02F 1/161 359/265 |
| 2001/0005275 A1 | * | 6/2001 | Ikai | G02F 1/153 359/272 |

OTHER PUBLICATIONS

Jaeger, Roger De., and Mario Gleria. "Silicones in Industrial Applications." Inorganic Polymers. New York: Nova Science, 2007. 61-161. Print. As reproduced by www.dowcorning.com/content/publishedlit/chapter19.pdf.*

* cited by examiner

*Primary Examiner* — Joseph P Martinez
(74) *Attorney, Agent, or Firm* — AJJER LLC

(57) ABSTRACT

This invention focuses on electrooptic devices and in particular on electrochromic (EC) devices with several aspects directed towards automotive EC mirrors and windows. Adhesive compositions are disclosed herein which improve device processing attributes and their performance and durability.

11 Claims, 13 Drawing Sheets

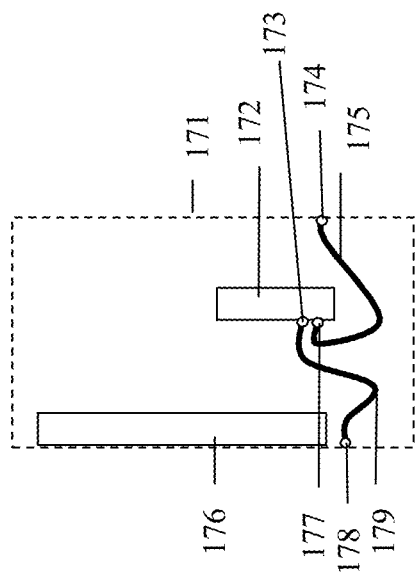

ELECTROCHROMIC MIRRORS AND OTHER ELECTROOPTIC DEVICES

RELATED APPLICATION/CLAIM OF PRIORITY

This application is a continuation of, and claims priority to U.S. patent application Ser. No. 13/084,430, filed Apr. 11, 2011 which is a divisional of U.S. application Ser. No. 12/781,699, filed on May 10, 2010, now U.S. Pat. No. 8,599,466, which is a divisional of U.S. application Ser. No. 11/927,462, filed on Oct. 29, 2007 (now U.S. Pat. No. 7,738,155), which in turn is a divisional of U.S. patent application Ser. No. 10/793,071, filed on Mar. 4, 2004, (now U.S. Pat. No. 7,300,166), each of the above applications (entitled 'Electrochromic Mirrors and other Electrooptic Devices') being related to and claiming priority from each of the following provisional applications:

1. Application Ser. No. 60/452,332 filed on Mar. 5, 2003;
2. Application Ser. No. 60/502,781 filed on Sep. 12, 2003; and
3. Application Ser. No. 60/531,463 filed on Dec. 19, 2003.

The contents of each and all of the foregoing applications are incorporated herein by reference.

TECHNICAL FIELD

This invention is relates to the field of electrooptic (EO) devices particularly those EO devices which are electrochromic (EC). The application of these devices are in displays, windows, and variable reflectivity automotive mirrors and mirrors for other applications.

BACKGROUND OF THE INVENTION

Electrochromic devices are being increasingly used for automotive mirrors and have been suggested for many different applications. Recently, several publications suggest use of ionic liquids in electrolytes for EC devices, e.g. WO 03/003110, U.S. Pat. No. 6,365,301, Japanese application 08-329479 (publication number 10-168028). Published US patent application 20040021928 discloses EC devices using ionic liquids along with preferred characteristics of ionic liquids suitable for electrooptic devices, and the entire disclosure of that application is incorporated herein by reference.

Electrochromic (EC) automotive mirrors and other devices that can be fabricated from electrolytes comprising ionic liquids have several advantages such as:

Negligible vapor pressure even at high temperatures
Non-flammable

However, the preferred ionic liquids used in this invention have several other advantages, some of which are:

High electrochemical stability range
Insensitive to moisture absorption
Low UV susceptibility
Low corrosion All of these characteristics lead to more durable EC devices.

FIG. 1 shows EC devices where an electrolyte 12 is sandwiched between two conductive, largely parallel substrates. The substrates 10, which are generally non-conductive, are pre-coated with a conductive material 11 on the inward facing surfaces. For windows, both the substrates and the coatings should be transparent (at least to the eye). Conductive transparent layers typically are indium tin oxide, fluorine doped tin oxide, etc. For mirrors at least one of these must be transparent. The other conductor may be a metal layer that also serves as a reflector, otherwise a reflector may be placed on one of the outwardly facing surface of the substrate. These are called single compartment devices as all electrochemical activity takes place within the electrolytic layer. Both electrochromic (EC) and electroluminescent (EL) devices may be made using such a construction. Such constructions are used for EC mirrors (e.g. automotive mirrors) for their self-erasing property, which means that the device spontaneously goes to a bleached state when the powering voltage is removed. The conductivity of the transparent conductors for automotive (and other transportation) rear-view mirrors is generally between 1 to 100 ohms/square. However, as disclosed in the U.S. patent application Ser. No. 10/741,903 filed on Dec. 19, 2003, electrolytes with higher ionic concentration may use higher resistance transparent conductors as compared to those devices which have lower ionic concentration. This application (application Ser. No. 10/741,903), which is incorporated herein by reference, also discloses that for automotive mirror applications, preferred electrolyte thickness is preferably lower than 250 microns.

The EC devices may contain other layers deposited on one of the electrodes. Schematics of such EC devices are shown in FIGS. 2 and 3. FIG. 2 shows the substrates 20 coated with conductive layers 21. An electrochemically active layer 23 is deposited on one of the conductive layers. Examples of such electrochemically active layers are tungsten oxide, Prussian blue, molybdenum oxide, vanadium oxide, polyaniline, polythiophene, and polypyrrole. Such layers may also include derivatives and mixtures of these materials. As an example, a commonly used derivative of polythiophene is poly-3,4-ethylenedioxythiophene. That material is useful in EC mirrors that are intended to have self-erasing property. FIG. 2 also shows another kind of EC device where the layer 23 changes its electrochromic properties from reflection to transmission. For example, Richardson, T. J. et al (Richardson, T. J., et al, "Lithium based EC Mirrors", Proceedings of the Electrochemical Society, (2003)) describe the layer composition as metal hydrides and their alloys, mixtures of magnesium and transition metals, and other metals such as copper, antimony, bismuth and silver. For example antimony doped with copper or silver changes reversibly from being reflective to being transmissive when reduced with lithium in the electrochemical cell.

FIG. 3 shows a device where each of the substrates 30 is coated with transparent conductor 31. One transparent conductor is coated with a material 33 (as described in Example 2, layer 23), such as tungsten oxide. The tungsten oxide is further coated with an ion-selective transportation layer 34 which primarily allows e.g., lithium to go through but blocks or retards the motion of the larger ions present in the electrolyte 32 (see U.S. Pat. No. 6,178,034). The electrolyte composition is usually the same as in Example 2. This limits the back reaction and increases the memory of the EC device. This construction is useful for large area windows to conserve power and allow uniform coloration. These may be used for visors, contrast enhancement filters for large displays, automotive and architectural windows.

FIG. 4 shows substrates 40, each coated with a conductive transparent layer 41. Each conductive transparent layer 41 is further coated with one additional layer (e.g. layer 43 or 45). One of these layers, e.g., layer 43 has to be electrochromic; the other layer (counterelectrode or the complimentary layer, CE) may be electrochromic or only store the ions reversibly. If the EC layer comprises tungsten oxide and molybdenum oxide, the CE can comprise polyaniline, nickel oxide, iridium oxide and vanadium oxide for electrochromic intercalatable layers. Some examples of non-electrochromic electrodes are cerium-titanium and vanadium-titanium oxide. Typically these EC devices have good memory and are useful for large area devices.

FIGS. 1 and 2 generally show the schematic structures of EC devices which are being used for commercial mirrors today. All presently fabricated commercial automotive EC mirrors have at least one redox dye (e.g. FIG. 2), and most have at least two redox dyes (e.g., FIG. 1) in the electrolytic medium. In FIG. 1, the electrolytic medium is in contact with the two opposing electronically conductive surfaces of the cell and in FIG. 2 there is a complimentary electrochemically active layer inserted between one of the electronically conductive surface and the electrolyte. In both cases at least one of the dyes or the electrochemically active layer is electrochromic. Electrochromic material is one which reversibly colors when it is either oxidized or reduced by an electric stimulus.

Almost all of the commercial mirror devices are made by backfilling an empty cavity with a liquid electrolyte or a liquid material which later reacts in-situ to form a solid electrolyte. Backfilling is conducted using a vacuum apparatus. Since the conventional electrolytic solvents have high vapor pressures, some of these evaporate during the backfilling process and thus contaminate the equipment. The equipment has to be cleaned periodically resulting in downtime. Since the ionic liquids have negligible vapor pressure this contamination is reduced for electrolytes comprising of ionic liquids resulting in a higher efficiency manufacturing process. The ionic liquids maintain negligible vapor pressure even at elevated temperatures, thus filling at elevated temperatures (preferably between 50 to 120° C.) can be carried out to lower the electrolyte viscosity and increase the back-fill rate. For backfilling at elevated temperatures the electrolyte and/or the cavity to be filled are pre-heated or heated during the operation.

The disclosure below relates to electrochromic (EC) device configurations and techniques that are particularly useful in forming automotive rearview mirrors, and many of which configurations and techniques are usable for any other application of electrochromic (EC) and other electro optic devices including transmissive type.

One objective of the present invention is to disclose novel reflective electrode compositions for EC mirrors.

Another objective is to disclose novel transparent conductors for EC mirrors.

Yet another objective is to disclose processes to deposit reflective layers and transparent conductors for electrochromic mirrors.

Still another objective is to disclose busbar patterns for electrochromic mirrors.

Yet another objective is to disclose sealant material compositions for electrochromic assemblies.

Another objective is to disclose integration of displays and indicators on EC mirrors Still another objective of this invention is to disclose compositions for solid electrolytes for use in electrooptic devices.

Yet another objective is to disclose electronic control circuits for electrochromic mirrors.

SUMMARY OF INVENTION

The present invention provides new and useful EC devices, particularly configurations that are useful as EC mirrors. The EC mirrors of this invention may be fabricated using electrolytes comprising ionic liquids or conventional solvents.

Moreover the present invention provides new and useful EC device configurations and techniques for EC mirrors, particularly in regard to forming (a) electrochromic layers, (b) conductive electrodes, (c) reflective layers, (d) transparent conductors, (e) busbar placement (f) displays (h) optical sensors for mirrors and (h) mirrors which color both during the day and night.

Still further, the present invention provides new and useful EC device configurations, techniques and compositions using solid-electrolytes and sealants that, while particularly useful with EC mirrors, have applications for other types of EC and electrooptic devices.

BRIEF DESCRIPTION OF DRAWINGS

FIG. 17: A schematics of an EC mirror with ASIC controller and optical fiber inputs.

DETAILED DESCRIPTION OF THE INVENTION

Solid Electrolyte Composition

Figure 1:
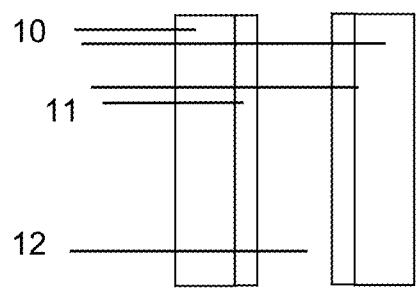
FIG. 1: Schematic of a single compartment electrooptic device.

Background of Electrolyte Composition for EC Devices

Electrolytes for EC devices, particularly for mirrors are generally liquids. These liquids may be chosen from high boiling point polar liquids, ionic liquids and their mixtures. The use of ionic liquids is new in many applications, and there are no commercial electrooptic products utilizing these as electrolytes. Throughout this specification more attention will be paid to the use of ionic liquids and shown how these may be used to easily substitute for conventional solvents resulting in devices with similar and/or improved attributes. However, it should not be construed that this invention is limited in scope only to those devices which use ionic liquids in their electrolytes, as many aspects of this invention are novel for many types of EC and other electrooptic devices and applications which may use conventional solvents in electrolytes.

Examples of preferred ionic liquids are given in "Room-Temperature Molten Salts Based on the Quaternary Ammonium Ion," J. Sun, M. Forsyth, and D. R. MacFarlane, J. Phys. Chem. B, 1998, vol. 102, pages 8858-8864. Most preferred cations for ionic liquids are saturated quaternary ammonium cations. The preferred quaternary ammonium cations for ionic liquid include, but are not limited to, pyridinium, pyrrolidinium, pyridazinium, pyrimidinium, pyrazinium, imidazolium, pyrazolium, thiazolium, oxazolium, and triazolium. These can have various substitutions or substituents, such as H, F, phenyl and alkyl groups with 1 to 15 carbon atoms. Rings may even be bridged. Preferred anions are fluorine containing such as triflate ($CF_3SO_3^-$), imide ($N(CF_3SO_2)_2^-$), beti (($C_2F_5SO_2)_2N^-$), methide ($CF_3SO_2)_3C^-$), tetraflourob orate ($BF_4^-$), hexaflourophosphate ($PF_6^-$), hexafluoroantimonate ($SbF_6^-$), $C_2H_5SO_4^-$ and hexafluoroarsenate ($AsF_6^-$). Of these, imide, beti and methide anions are more preferred. An example of a preferred ionic liquid (IL) is 1-Butyl-3-Methyl Pyrrolidinium bis (trifluoromethanesulfonyl)imide (BMP).

Ionic liquids may be used by themselves to form the solvent system for the electrolytes or conventional solvents (non-ionic) may be added as co-solvents (one or more) for a variety of reasons. Some of the reasons for the use as co-solvents with ionic liquids are: viscosity control, change in ionic conductivity, change in freezing point, change in device kinetics and change in solubility of other added ingredients such as dyes, salts and UV stabilizers. Typically, it is preferred that in the finished electrolyte the proportion of the ionic liquid to the co-solvents is greater than 1:4 by weight. A more preferred ratio is greater than 1:2 and the most preferred ratio is greater than 1:1 including electrolytes which may not comprise any non-ionic solvents. Most preferred non-ionic solvents are propylene carbonate, ethylene carbonate, dimethyl carbonate, ethylmethyl carbonate, dipropyl carbonate, diethoxy ethane, sulfolane, methyl sulfolane, cyanoethylsucrose, 3-hydroxypropionitrile, 3-3'-oxydipropionitrile, 2-methylglutaronitrile, acetylbutyrolactone, and gamma-butyro lactone. Flourinated carbonates may also be used, some examples are methyl 2,2,2-trifluoroethyl carbonate (MTFEC), ethyl 2,2,2-trifluoroethyl carbonate (ETFEC), propyl 2,2,2-trifluoroethyl carbonate (PT-FEC), methyl 2,2,2,2«,2«,2« -hexafluoro-isopropyl carbonate (MHFPC), ethyl 2,2,2,2',2',2'-hexafluoro-isopropyl carbonate (EHFPC), and di-2,2,2-trifluoroethyl carbonate (DTFEC). Many other solvents which can be used as co-solvents are listed in U.S. Pat. No. 6,245,262 as plasticers. In addition, the ionic liquid component may itself comprise of more than one ionic liquid and may have same or different anions.

Figure 2:
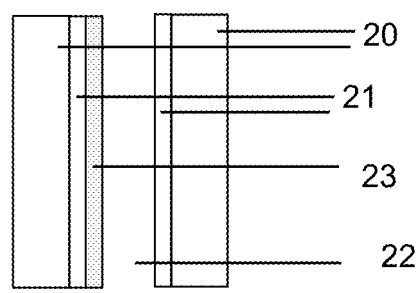
FIG. 2: Schematics of an EC device with an electrochemically active layer.
Figure 3:
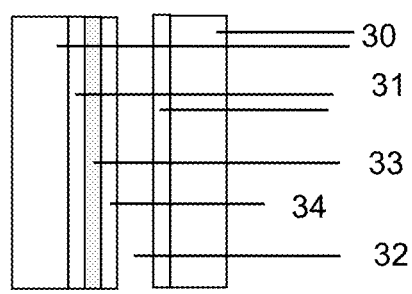
FIG. 3: Schematics of an EC device with an electrochemically active layer covered with an ion selective layer.

Anodic and cathodic compounds for EC devices of type shown in FIGS. 1, 2 and 3 can be chosen from various candidate materials. Some examples of anodic dyes are compounds that comprise pyrazoline, metallocene, phenylenediamine, benzidine, phenoxadine, phenothiazine, tetrafulvalene and phenazine; and cathodic compounds that comprise viologen and anthraquinone. More details on these with specific examples and derivatives may be found in Shelepin-1 (Shelepin, I. V., et al, Elektrokhimiya, vol 13, no 3, (1977) p-404), Shelepin-2 (Shelepin, I. V., et al, Elektrokhimiya, vol 19, p-1665, (1983)), U.S. Pat. Nos. 6,392,783; 6,445,486; 6,496,294, European patent application 0055012, WO 01/63350, U.S. Pat. No. 4,902,108 and U.S. Pat. No. 5,140,455. One has to ensure that these dye materials solubilize in the electrolytic medium, and it is preferred if the dyes are ionic (i.e. have an anion and a cation), such as viologen salt, the anion of the dye be the same as the anion of one of the ionic liquid(s) in the electrolyte. If more than one viologen salt is used it is preferred that at least one of these has the same anion as that of the ionic liquid in the electrolyte or one of the ionic liquids in the electrolyte. As disclosed in application Ser. No. 10/600,807 and provisional application (Application No. 60/502,133), the preference is to use at least one bridged dye. A bridged dye has more than one functionality in a single molecule which may be anodic and cathodic functionalities, or where these functionalities may be combined with UV stabilizing moeties. Preferred classes of bridged dyes with anodic and cathodic moieties are those, which comprise of ferrocene (anodic) and viologen (cathodic) moiety (abbreviated as Fc-Vio). Examples of these (Fc-Vio) are in the above patent applications and in U.S. Pat. No. 6,519,072 and in Meyerhans et al. (Meyerhans, A., et al., Helvetica Chimica Acta, Vol 65 (1982), p-2603). For use in EC devices with BMP as ionic liquid in the electrolyte, a preferred anion is imide. Another preferred combination of anodic and cathodic moiety is those having dihydrophenazine (anodic) combined with viologen (cathodic) (abbreviated as Ddp-Vio). Examples of these are given in U.S. Pat. No. 6,241,916 and in Michaelis, A., et al., Advanced Materials, Vol 13 (2001) p-1825. The bridged dyes may have any anions which are listed above for the ionic liquids, however, the most preferred ones are imide, beti and methide. As an example, a bridged dye Fc-Vio with imide anions will be abbreviated as Fc-Vio imide. Other preferred dyes are charge transfer compounds including those with titanium (III), vanadium (III), vanadium (IV), iron (II), cobalt (II), copper (I), silver (I), indium (I), tin (II), antimony (III), bismuth (III), cerium (III), samarium (II), dysprosium (II), ytterbium (II), or europium (II) as described in patent application Ser. No. 10/600,807 and provisional application (Application No. 60/502,133). In all cases it is also preferred that when electrolytes comprise ionic liquids, the anion of these should be similar to the anions of the dye. Preferred anions are triflate ($CF_3SO_3^-$), imide ($N(CF_3SO_2)_2^-$), beti (($C_2F_5SO_2)_2N^-$), methide ($CF_3SO_2)_3C^-$), tetraflouroborate ($BF_4^-$), hexaflourophosphate ($PF_6^-$), hexafluoroantimonate ($SbF_6^-$), $C_2H_5SO_4^-$ and hexafluoroarsenate ($AsF_6^-$) of which imide, methide and beti are most preferred and these also result in high hydrophobicity making electrolytes less susceptible to moisture ingress. Specific examples of dyes in all these classes are given in the above-identified patent applications.

It is well known in the art to use complimentary coloring materials to control color. In those devices where only EC layers are used for redox reactions (see FIG. 4), complimentary coloring materials are often used. One may use a layer with tungsten oxide with a counterelectrode comprising nickel oxide, vanadium oxide, etc. As an example, tungsten oxide colors blue in the reduced state and nickel oxide colors brown while vanadium oxide colors to a yellow tint when oxidized. Thus, a tungsten oxide and nickel oxide based device colors to a more neutral color, whereas a tungsten oxide device with vanadium pentaoxide colors to a green color. Further, these layers may be doped for color control (as an example tungsten oxide doped with zirconium oxide, molybdenum oxide or vanadium oxide colors to a more neutral color) and when tungsten oxide is doped with small amounts of chromium oxide, copper oxide and cobalt oxide there is a shift in the UV spectrum, which does not cause a visible color change, but improves the UV stability (e.g. see U.S. Pat. No. 6,266,177). In those devices where dyes are used in the electrolyte (with or without redox layers), several dye combinations may be used to get the desired color. These electrolytes may comprise more than one cathodic dye and/or more than one anodic dye to achieve this purpose. Such devices for conventional solvent electrolytes are described in European patent application 00758929/EP B1, U.S. Pat. No. 6,288,825 and Shelepin-2. U.S. Pat. No. 6,288,825 and Shelepin-2 particularly discuss those systems where a third dye (anodic or cathodic) is used in addition to at least one anodic and one cathodic dye. In European patent application 00758929/EP B1 a tungsten oxide based mirror is described with two anodic dyes in the electrolyte to give the device a more neutral-color appearance using a ferrocene in combination with phenothiazine in a molar ratio of about 1:1 to about 1:10. There is no restriction on using the same principles in devices with ionic liquids as long as the components are compatible. In one aspect the range of dyes can be expanded by using those dyes that require higher redox potentials and may have led to irreversible electrochemical reactions in conventional electrolytic fluids. It is preferred that the dyes for color control of this invention use at least one bridged dye in the electrolytes for EC devices of the type shown in FIG. 1. The preferred classes of bridged dyes were described above. One may add more than one bridged dye, such as Fc-Vio and Ddp-Vio. For example, either one of the two bridged dye classes named above may be added along with non-bridged dyes in the electrolyte, where the non-bridged dyes preferably belong to one of the class selected from phenazine, ferrocene, phenothiazine and hydrazone for anodic dyes; and viologen, and anthraquinone based dyes for cathodic ones.

As for conventional solvent-based devices, anodic and cathodic dyes may also be modified in a way so that UV energy receptors (typically known UV stabilizer moieties such as benzophenones, benzo-triazoles, etc.) can be covalently attached to them. This is another class of bridged dyes. These receptors absorb the UV radiation before they damage the redox or the coloring moiety. Such dyes are called bridged dyes as they combine more than one function in the same molecule. Such modified dyes can be used in electrolytes comprising ionic liquids as well. Their use in non-ionic solvents is described in U.S. Pat. No. 6,362,914. For example, this patent describes a cathodic compound where a viologen is modified by attaching an energy receptor. This material is 1-methyl-1[1-benzotriazole-2-hydroxy-3-t-butyl-5 propyl(propionate)-[benzene]]-4,4-bipyridinium bis tetrafluoroborate. For use in ionic liquid where the anion is imide, it is preferred that this material be ion exchanged so that the tetrafluoroborate ion is exchanged for imide ion. The advantage of doing this is to increase the UV stability of the device, and impart even better UV stability to the dye containing devices when colored in presence of solar radiation. In addition, there is a possibility that such devices comprising ionic liquids with low absorbance in the UV may not require additional UV stabilizers. Bridged dyes may have both anodic and cathodic moieties in the same molecule in addition to the covalently attached UV energy receptors.

A bridged molecule can be so tailored (donor/acceptor duo) so that inherently it has good UV stability (Fifth International meeting on Electrochromism (IME5), Denver, 2002, and also published, see Akita, S. et. al., (Akita, S. et. al., Solid State Ionics, Vol 165 (2003) p-209). When such dyes are used in EC devices for mirrors additional UV stabilizers may not be required. For example a UV stable dye is produced when a ferrocene moiety is coupled with a viologen moiety using an appropriate linker or bridge. We have also discovered that the UV stability is also controlled by the selection of the anion of the dye, and the preferred anions are imide, beti and methide. These molecules can also be used in the ionic liquids and it is preferred that the anion associated with this molecule (or with the viologen moiety) is similar to the anion of the ionic liquid. As an example a preferred anion is imide when used with ionic liquid comprising of imide ions. Further, these molecules i.e., where the anodic and the cathodic entities are in a single molecule may also be bridged with energy receptors to increase their UV stability even more. It is preferred that the UV stabilizer moiety be linked to the same bridge which joins the two redox moieties.

Typically the molar concentrations of the anodic and the cathodic compounds in the electrolyte are largely equivalent. This condition is automatically fulfilled when a balanced bridged dye compound is used, i.e., a dye which has one anodic and one cathodic moiety. The imbalance in the concentration of the anodic and the cathodic moieties in bridged dye comprising electrolytes may be caused by use of imbalanced-bridged compounds (i.e. single molecules with more of one type of moiety) or by further adding dyes with only anodic or cathodic nature. A preferred imbalance of anodic to cathodic moieties is in a range of about 1:2 to 2:1. This selection may be largely based on empirical results from cycling, durability and optical tests. For conventional electrolytic solvents, U.S. Pat. No. 6,353,493 and Ushakov, et. al. (Ushakov, et. al., Elektrochimiya, vol 21, p-918, 1985) describe that the concentration balance of electroactive compounds is better determined by establishing their current limiting concentrations based on their mobility. Since, the mobility of the dyes may change in ionic solvent comprising electrolytes, similar principles can also be used to establish their concentrations if desired.

Additional components may be added to the electrolytes which could enhance kinetics. These materials help in oxidizing the reduced electrochromic species in the cell or help reduce the oxidized electrochromic species in the cell. These additives are described in U.S. Pat. No. 6,266,177. The preferred additives in this application are metallocenium salts such as ferrocenium salts and salts of ferrocenium derivatives. These additives and their concentrations are chosen so that they do not impart too much color to the cell in the bleached state. Such additives have also found use in keeping the bleach transmission high in oxygen atmosphere under high pressure testing, e.g., U.S. Pat. No. 6,486,998. In both of the foregoing patents several materials are described which facilitate reversing of the colored electrochromic species. One or more such additives can also be used in the devices of this invention. These additives can be used in the present invention as long as they are soluble. One may also use salts of bridged dyes, e.g., $Fc^+$-Vio. For example if metallocenium salts are used, it is preferred that their anion is the same as that of one the ionic liquids comprising the electrolyte. Typically, the desired concentration of such an additive is preferably lower than 5 times the concentration of the dyes, and more preferably less than 10 times the concentration of the total amount of anodic or cathodic dye. These additives are preferably reversible reducing or oxidizing agents. In addition one has to be careful in the choice of these additives that they are stable to UV light when used for outdoor applications or where the devices are subjected to UV.

Figure 4:
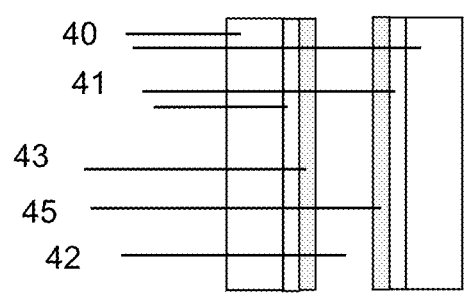
FIG. 4: An EC device with an EC layer and a complimentary layer.

In most EC devices where the EC activities are associated with dyes in the electrolyte, the attenuation of the solar radiation is in the visible range only. However, for energy efficient windows it is important to be able to also reduce the transmission in the Near Infrared (NIR) region as almost half of the solar energy is comprised of this radiation. This could be done by incorporating electrochromic layers into the device (as shown in FIGS. 2-4) which attenuate in the NIR region such as those comprising of tungsten oxide, conductive polymers (e.g., polyaniline and its derivatives); by depositing metals at the electrodes which block in a wide wavelength range; or by using dyes which absorb in the NIR radiation. More on IR blocking materials for example are respectively given in U.S. Pat. No. 5,729,379 (for metal oxide based layers), U.S. Pat. No. 6,256,135 (for conductive polymer based layers) and U.S. Pat. No. 6,256,135 (for metal depositing device). WO 99/45081 describes dyes which may be added to the electrolytes to absorb in the NIR. The electrochromic layers do not require modifications to be used with ionic liquids comprising electrolytes as long as there is good adhesion to the electrolyte layer if this layer is solid. The NIR absorbing dyes should be soluble in the electrolyte.

Use of Solid Electrolytes in Mirrors

Solid electrolytes promote safety in mirrors by containing both the electrolyte and broken shards of substrate in case these break on impact. When the front glass substrate is lower than one mm in thickness, then the electrolyte should preferably be a solid to provide superior mechanical integrity. Solidification of the electrolyte can be done in many ways including polymerizing a monomer which is dispersed in the electrolytic medium and it is polymerized after filling the cavity, for example see U.S. Pat. No. 6,420,036. Although several ways are described in this patent, a preferred way to transform the electrochromic polymeric solid films is by in-situ polymerization. A low viscosity electrochromic monomer composition is filled in a pre-fabricated cell cavity which is then exposed to electromagnetic radiation and/or by heat for in-situ polymerization. Alternatively, preformed solid films of polymers plasticized with electrolytic components may also be laminated between the substrates carrying the two electrodes, e.g., see U.S. Pat. No. 6,639,708 and WO 03/003110.

Thus the monomer compositions for filling cavities in the invention disclosed here will typically comprise of ionic liquid, redox dye(s), and polymerizable monomers. Optionally, UV stabilizer(s), catalysts, initiators, non-ionic cosolvents and other salts may also be included. Some of the dyes may also be polymerized into the polymer network. To keep the polymerization caused shrinkage low, it is preferred that the monomer composition should have molecules which participate in the polymerization reaction less than 25% by weight of the total composition and more preferably less than 10% by weight. An example may be use of 2-hydroxy ethyl methacrylate (polyHEMA) with ethylene glycol methacrylate as the crosslinker and an appropriate catalyst such as benzoyl peroxide which are all dissolved in the electrolyte. When this liquid composition is placed in the EC cavity then the polymerization is conducted in-situ, e.g., by heating. Polymers for the preferred ionic liquids of choice are generally fluorinated, this is in part to have good solubility and UV stability. Polymers and copolymers could be formed by in-situ polymerizing tetrafluoromethylacrylate; 1H, 1H, 7H, Dodecafluroheptyl methacrylate; and a variety of fluorinated polyethers. Functionalized fluoroethers are available from Solvay Solexis (Thorofare, N.J.) under the tradename of Fluorolink. Functionalized fluoropolyethers may be crosslinked using various chemistries such by using comonomers so that reactions with epoxy and isocyanats groups result in polymer formation. The comonomers may be non-fluorinated. Generally, the cross-linker concentration is less than 5 mole percent (preferably less than 2 mole %) based on all monomers. The monomers for polymerization may polymerize by addition or condensation polymerization. Those condensation polymerizations are preferred which do not release any new small molecules such as water and gases. Some of the preferred mechanisms are reactions between amines and epoxies, amines and isocyanates, isocyanates and hydroxyl groups. Addition reactions may be ring opening polymerizations or through the opening of unsaturated bonds and rings. To form a polymer which will solidify at low concentrations, those systems are preferred which form a three dimensional network. This means that for condensation systems there should at least be one monomer which is trifunctional or of higher functionality. For polymers forming networks by addition polymerization, use of polyfunctional monomers (those monomers which have at least two polymerizable unsaturations) is required. A number of chemistries which may be employed here are listed in U.S. Pat. No. 6,245,262. Other than the monomers, appropriate catalyst may also be required. The details of materials, chemistry and reactions are well known and may be found in a standard polymer chemistry book (e.g., see Polymer Chemistry: An Introduction, by M. P. Stevens, Oxford University Press (1998). For low shrinkage it is preferred that those monomers be used which have high molecular weight (e.g., functionalized pre-polymers and oligomers), typically greater than 2,500, and preferably greater than 5,000. Such monomers may raise the viscosity which may be overcome in the backfilling process of the cavities by increasing the temperature (see US patent application 2004/0021928).

Formation of Solid Electrolytes by Multiphase Systems

A novel way of forming clear solid electrolytes is by the use of those polymers (including copolymers) which result in multi-phase structure, meaning two or more phases. One phase is readily soluble in the electrolyte at all temperatures in which the device needs to function, and at least one phase is insoluble or has low solubility in this temperature range. The fall out of the second phase from the solution may result in crystallization of this phase or even a physical or chemical bonding which may require elevated temperature to disperse. Thus, the second phase has a distinct glass transition temperature (Tg) or melting point. Addition of polymers which form single phase to thicken electrolytes is not new, e.g. see Shelepin-3 (Shelepin, I. V., et. al., Elektrokhimiya, Vol 13, (1977), p-404), U.S. Pat. Nos. 5,142,407; 5,145,609 (e.g., see Table 1 in both of these publications) and U.S. Pat. No. 5,801,873. Viscosity modification by adding polymers that form single phase results in a continuous increase in viscosity with the amount of additive. Further, this viscosity is sensitive to temperature. A highly viscous material at room temperature may flow freely at 50° C. Further if large amounts (typically greater than 30%) of solid polymer is added for thickening, then filling such fluids in cavities is difficult and also leads to considerable slow down in device kinetics. However, the change in viscosity with addition of polymeric material is very different for a system forming the two phases when observed below the Tg or melting point of the second phase. With small amount of polymeric addition a viscosity rise is seen, however as the additions continue, suddenly at a particular concentration viscosity rises rapidly and is not measurable. This happens when there is sufficient amount of polymer which is able to form a continuous network of the 2 phase structure, and the domains of the $2^{nd}$ phase are interconnected by polymer chains compatible with the electrolytic phase throughout the bulk of the electrolyte body. This is similar to the on-set of gel-point in the formation of crosslinked systems, defined as the first instance when an infinite molecular weight body is first formed (e.g., see P. J. Flory, Chapter 9, Principles of Polymer Chemistry, Cornell Univ. Press (Ithaca, N.Y.), 1953). One may use viscosity modifiers in addition to materials that result in formation of a second phase. For 2 phase systems, the present invention contemplates a first phase as the one which is more compatible or well dispersed in the electrolyte, and the subsequent phases, such as second phase being less soluble in the electrolyte. At least one of the subsequent phases keeps parts of the polymeric chains physically locked which results in an overall solidification of the electrolyte.

There are several examples of polymers forming multi-phase systems. Thermoplastic elastomers formed from styrene/butadiene/styrene block copolymers where butadiene forms the continuous flexible phase and styrene blocks preferably agglomerate in embedded domains which are hard and only become soft above the Tg (glass transition temperature) of the polystyrene which is around 100° C. To dissolve these polymers in liquid electrolytes one may have to use elevated temperature and/or severe agitation, such as by using ultrasonic mixers. Once these are put in cavities, the second phase forms by one or more of cooling or absence of motion or shear. In the example above, when the polymer is introduced in the electrolytic environment, the properties of the second phase may be different as compared to in the bulk phase. For example, the second phase may incorporate one of the components of the electrolyte, or this phase may take up solvent in a different proportion as compared to the amorphous phase, or there may be stresses due to the forces exerted by the amorphous phase swelling, etc.

For electrochromic devices the cavities are typically formed by two conductors as shown in FIGS. 1 through 4. Generally, these substrates are parallel to one another. The distance between them is controlled by perimeter sealant or by putting some spacers between the two plates within the active area of the device. These spacers may be made out of a material, e.g. a polymer, which may later dissolve in the electrolyte. As discussed above and in all automotive EC mirrors produced today, the liquid electrolyte may be introduced by back filling through a hole left in the perimeter seal, which is plugged after sealing. When polymers capable of forming two or more phases are added to the electrolytes, the cavities are preferably backfilled at temperatures higher than the melting point or the Tg of the second phase. If even at elevated temperatures the viscosity is too high for back-filling, one may inject the electrolyte under pressure into the cavity. Thus, for making EC devices including automotive mirrors by injection process, it is preferred that the perimeter sealant has at least two openings, which are preferably located at the two diagonal or long ends of the device. One of these is for filling by injection and the other is for venting. One may optionally flush the cavity before filling with an inert gas such as nitrogen or argon and then fill the cavity. During filling one may apply vacuum on the vent port to aid filling. After filling both the openings are plugged. There may be more than two openings depending on the shape and size of the cavity so that multiple injection and/or vent ports may be required for uniform filling. When filling with fluids at elevated temperatures the cavities may be pre-heated. The plug holes may be in the substrates or in the main seal. After filling the cavities, they may be heated above the melting point or Tg of the second phase and then cooled to reform the second phase. This may be beneficial to remove any irregularities and stresses caused by the filling process. Thus the preferred process is to introduce the electrolyte in a liquid form into the cavity which comprises of perimeter sealed two substrates which are spaced apart. The liquid is converted to a solid after it is introduced into the cavity as it forms a multi-phase system.

For those devices which require good optical properties, the electrolyte should be clear and free of visible haze. Haze is particularly more visible in mirrors than in windows and more so from glare sources such as lights from road traffic. It is preferred that haze in these mirrors be lower than 1%. Typically this is achieved by having the second phase to be smaller in size than the wavelength of the visible light, i.e., smaller than 400 nm or preferably below 100 nm so that the light is not scattered and clarity is maintained. Crystallizable copolymers of vinylidenefluoride (VF) and hexafluoropropylene (HFP) can result in two phase systems. Alternatively, if the size of the second phase is larger than 400 nm, the refractive index of the second phase should match that of the electrolyte (typically within 0.05 or more preferably within 0.01). In this case blocks of PolyVF crystallize while blocks of attactic polyHFP and random copolymer sequences of VF and HFP remain amorphous and more accessible to the liquid electrolyte. These block copolymers may be linear or branched. The blocks which crystallize may be distributed along the main chain of the polymer or they may only be located in the side chains (branches or grafts). Block copolymers may be also formed of polymethylmethacrylate and PolyHEMA, where the former polymer may form the second phase and the latter may be soluble in the electrolyte. If the electrolyte composition is such that it solubilizes polymethylmethacrylate, then it may be substituted with another polymer, e.g., polystyrene and polyacrylonitrile. When linear polymers are used then multiblock or triblock colpolymers are preferred. A particularly preferred arrangement is a triblock polymer where the two ends of the chain have those blocks which form the second phase which is not soluble in the electrolyte and the block in the middle is soluble in the electrolyte. The length of the end blocks may be 10 to 1000 of units long (monomer repeat units), and preferably less than 100 units. The ones in the center may be 100 to 10,000 units long. When graft copolymers are used then the blocks forming the hard domains (second phase) may reside at the end of backbone polymer chain or in the grafted branches. In addition, random copolymers which do not form a second phase may also be optionally added to change properties and size of the second phase. Polymer content in the electrolyte is generally in the range of 2 to 30% by weight of the electrolyte. A more preferred range is between 5 and 25%. More than one polymer forming a second phase may be added to solidify the electrolyte. One or more of these may form the second phase. There may also be additives so that when the second phase is formed, the chains in this phase are optionally crosslinked. There are several grades of commercial polymers comprising at least one of VF and HFP that are available for solidification. Depending on the temperature range of device operation and its interaction with the other electrolytic components, one or more of these may be selected. Atofina (Philadelphia, Pa.) sells these under the tradename of Kynar™ and some of the grades are 301F, 741 LBG and Kynar Flex 2801 and these may also be obtained from Solvay (Thorofare, N.J.) under the trade name of SOLEF™ and some of the grades being 1015, 6020, 21216, 20816, 20615 and 11008. Two phase systems may also be formed using homopolymers where the second phase forming domains are isotactic or syndiotactic, and the ones forming the more soluble phase with the electrolyte are atactic. When a multiphase system is used to solidify the electrolyte, then it is preferred that the Tg or the melting point of one of the phase in the electrolyte is greater than 50° C. and for some applications such as automotive glazing it may be above 85° C. A preferred EC mirror system comprises a single compartment, self erasing device (FIG. 1) or a compartment comprising one electrochromic coating (FIG. 2) which is filled with a clear solid formed by a multiphase polymer as described above. The electrolyte in the compartment may comprise anodic and cathodic dyes in addition to UV stabilizers. These dyes may also be bridged.

Alternative Methods to Immobilize Liquid Electrolyte

Yet another method to immobilize the electrolyte in the cavity is by using a sheet of polymeric open cell foam or an aerogel sheet or a sheet which may be able to soak liquid electrolytes. This sheet is cut in the shape of the cavity and then assembled inside of the cavity. Optionally, this sheet may also act as a spacer between the two plates. It is preferred that the electrolyte have a refractive index within 0.05, preferably within 0.01 and most preferably within 0.005 of the material of which the foam is made out of to reduce the scattering of light. The electrolyte is filled in a cavity comprising this foam (e.g. by backfilling through a hole left in the perimeter seal) and the liquid permeates through the pores. After filling the fill hole is plugged. Since the refractive index between the liquid electrolyte and the foam material is matched, one does not notice the presence of foam. In case of device breakage, the electrolyte may be held within the foam and not drip.

Yet another method to immobilize the electrolyte is by depositing a coating on one of the conductive substrates. This coating is removed from the perimeter where the adhesive would be dispensed to form the cavity. This coating is preferably crosslinked or is of a polymer capable of forming multiple phases (as described above). The crosslinked polymer swells and fills the cavity as it absorbs the electrolyte during the filling process or subsequent to filling aided by temperature and/or time. The two phase polymer gets dispersed in the electrolyte and solidifies the entire electrolytic mass.

All of these novel ways of solidification are applicable to all different types of EC devices including the single compartment device of type shown in FIG. 1. EC devices where a material is deposited on one of the electrodes (e.g. see U.S. Pat. No. 5,923,456) are also included. Active optical devices such as electroluminscent, photoelectrochromic and photochromic devices employing electrolytes or liquid mediums as given in U.S. patent application Ser. No. 10/741,903 may also be solidified using the present disclosure. In general, optical filters or glass laminates where solid interlayers are preferred between two substrates can also be made using these principles.

EC Mirror Electrodes and Busbars

EC Mirror Electrodes and Methods to Deposit them

Figure 5A:
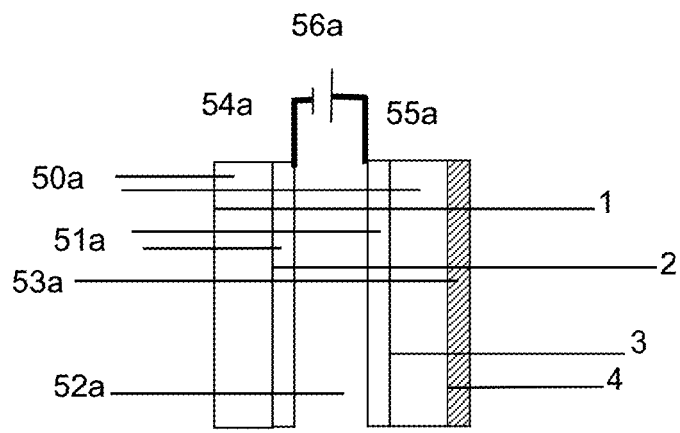
FIG. 5a: An EC mirror construction showing a fourth surface reflector.

Typically electrochromic mirrors, for automotive and other transportation use are made using a cell with two transparent conductors facing inwards and in contact with electrolyte and/or redox layers, e.g., as described earlier in FIGS. 1 and 2. Generally, the reflective metal layer is outside the active electrochromic cell as shown in FIG. 5a. This figure shows an EC mirror device based on the principles of FIG. 1. The mirror is constructed of two substrates shown by 50a. The inward facing surfaces of these are coated with transparent conductive coating 51a. The two substrates are joined by an electrolyte 52a. Layer 53a is reflective. In addition, the four surfaces of the two substrates are marked 1, 2, 3 and 4 numbering these surfaces. The reflector 53a is located on the fourth surface and the device is viewed from the side of the surface 1. This is called a fourth surface mirror. This figure also shows the connectors 54a and 55a along with a power supply 56a. The connectors 54a and 55a make contact with the two conductive electrodes 51a.

Figure 5B:
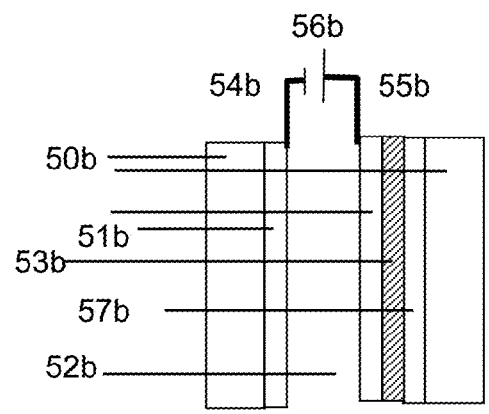
FIG. 5b: An EC mirror with third surface reflector.

Increasingly, the reflective layer is substituted for the interior transparent layer located on surface 3 to work both as a reflector and a conductor as described in WO 00/23826 and in U.S. Pat. Nos. 6,245,262; 5,668,603 and 3,280,701. This means that a conductive reflector will replace the transparent conductor on surface 3, and are called third surface mirrors. Generally the preferred metallic layers should be such that they do not react electrochemically during the oxidation and reduction of the electrochromic or other electrochemically active materials and do not corrode at the perimeter (outside of the cell) where they are attached electrically. Generally the preferred materials in commercial devices are rhodium, silver, silver alloys, aluminum, aluminum alloys and chromium. To prevent corrosion (either inside or outside the cell), multiple stacks are used where some of the metals, particularly silver and aluminum are overcoated with a layer of a transparent conducting metal oxide (e.g. ITO, antimony doped tin oxide). The transparent layer prevents the electrolyte in contacting the metal layer and hence prevents corrosion. In the above reflective metal choices chromium and rhodium are generally used for outside automotive mirrors due to their lower reflectivity. In all of these patents and applications, generally two or more metal layers are used for reflection. This is perhaps, as pointed out in U.S. Pat. No. 5,668,663, because there is a need for using a tie layer to increase adhesion of more reflective materials such as silver and aluminum. The idea of using a tie layer is not novel for these metals deposited on glass by physical vapor deposition (e.g., evaporation and sputtering), where a more reactive metal such as chromium or titanium is first deposited to react with the surface active groups on glass such as bound water and —OH groups. A third surface single compartment device is shown in FIG. 5b. The two substrates are shown by 50b, electrolyte by 52b, the two powering leads by 54b and 55b and the power supply by 56b. The transparent conductive coatings are shown as 51b. One of these is deposited on a reflective layer 53b. The reflective layer was pre-deposited on the substrate after depositing a tie layer 57b. The transparent conductive coating which is deposited on the reflective layer is only for electrochemical protection, thus its conductivity may be lower, or composition be different or microstructure be different, or thickness be different as compared to the transparent conductor on the other substrate.

Figure 5C:
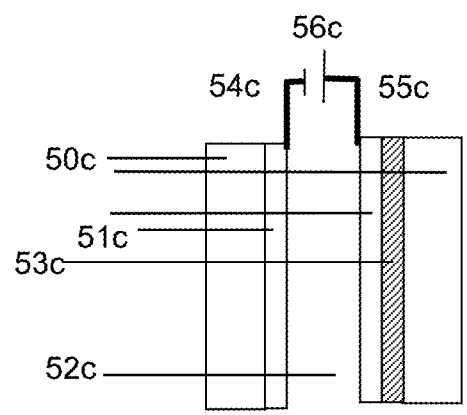
FIG. 5c: An EC mirror with third surface reflector without a tie layer.

However, according to the present invention, one can avoid the deposition of tie layers by removing these reactive groups and/or surface modification. One way to remove reactive groups is to treat the substrate before metal deposition by high energy processes such as by ion treatment (e.g. oxygen, xenon, nitrogen and argon ions) and plasma treatment (e.g., argon, xenon, ammonia and oxygen plasma). This treatment is preferably done in the same chamber where the metal is deposited, and the metal deposition begins after the treatment process without exposing the activated surface to ambient atmosphere, e.g., by not breaking the vacuum around the substrate between the activation and deposition process. The ion and plasma treatment may even continue during the deposition of the metal to ensure uniform nucleation, high density and low stresses. During these treatments and deposition processes the substrates may also be optionally heated (e.g., from 50 to 400° C.). Typical metal thicknesses are in the range of 50 to 500 nm. Stelmack, et. al. describe ion assisted process and the equipment used in more detail (Stelmack, L. A., Nuclear Instruments and Methods in Physics Research B37/38 (1989), p-787). A third surface single compartment device is shown in FIG. 5c without using a tie layer. The two substrates are shown by 50c, electrolyte by 52c, the two powering leads by 54c and 55c and the power supply by 56c. The transparent conductive coatings are shown as 51c. One of these is deposited on a reflective layer 53c. The transparent conductive coating which is deposited on the reflective layer is only for electrochemical protection, thus its conductivity may be lower, or composition be different or microstructure be different, or thickness be different as compared to the transparent conductor on the other substrate.

One type of ion-source that may be used for this purpose is called End-Hall ion source. End-Hall ion sources are made by several companies and may be installed in the metal deposition chambers. Some of these are Kaufman & Robinson (Fort Collins, Colo.), Advanced Energy Systems Inc (Medford, N.Y.) and VEECO (Woodbury, N.Y.). A more preferred type of End-Hall source are gridless type. These sources are low accelerating voltage (usually lower than 500 eV and preferably lower than 300 eV, and most preferably lower than 100 eV) and high current (usually greater than 1 A), resulting in surface ion flux of about 1-5 mA/cm$^2$. The ion energy in eV for an accelerating voltage of 500V is equivalent to 500 eV. These sources are compatible with a variety of physical vapor deposition (PVD) methods such as thermal evaporation, e-beam evaporation, sputtering, magnetron sputtering, etc. End-Hall ion sources are described in Kaufmann, et. al (Kaufmann, H. R., Journal of Vacuum Science and Technology A, vol 5 (1987) p-2081), U.S. Pat. Nos. 6,608,431 and 4,862,032.

Once the metals are deposited, an optional coating of a transparent conducting oxide may be deposited. This is done, because several of the metals may react with the electrolyte when the devices are powered, and the oxide conductors are more inert. The use of End-Hall source during the deposition of these oxide conductors results in high conductivity and density without the use of high temperatures (i.e. excess of 250° C.) or use of reactive gases (such as oxygen) or post treatment at these temperatures in reducing and/or oxidizing atmosphere. An example of preferred transparent conductive oxide with high electrochemical stability is an alloy of zinc oxide and aluminum oxide (e.g., AZOY™ from GFE Metalle and Materialien (Germany)). Indium-tin oxide (ITO), tin oxide doped with antimony or fluorine may also be used. Typical thickness of oxide conductors is from 30 to 300 nm.

Although plastics or glass may be used for the substrates due to their lightweight, for automotive EC mirrors, preferred substrates are glass due to their scratch resistance, inertness, rigidity, thermal stability and low permeability to gases and water. In this application "glass" for substrates refers to inorganic glasses, such as soda-lime glass, borosilicate glass, etc. Alternatively one may also use a reflective and conductive foil laminated to another substrate, which may be made of a plastic, glass, ceramic or any other material. Alternatively a machined metal plate which has high reflectivity on one side (e.g. polished) may also be used. The metal foil or laminate may have a conductive oxide coating to impart inertness. The use of laminated or metal plates also increases the scatter-resistance of the mirror devices.

The present invention allows one to use many different metals without tarnishing including silver and silver alloys, aluminum and aluminum alloys, rhodium, chrome, tantalum, nickel and its alloys, stainless steel, etc., which are in contact with electrolyte. The devices of prior invention typically use at least one salt or a dye salt with an anion $PF_6^-$, $CF_3SO_3^-$, $BF_4^-$, and $ClO_4^-$. These anions are corrosive to several metals, thus special alloys and overcoats are required. According to the present invention, the use of "imide" or bis(trifluoromethylsulfonyl)imide ($N(CF_3SO_2)_2^-$); "beti" or bis(perfluoroethyl sulfonyl)imide (($C_2F_5SO_2)_2N^-$); "methide" or tris(trifluoromethylsulfonyl)methide ($(CF_3SO_2)_3C^-$) as anions in the electrolytes is preferred. Preferred ionic liquids based on such anions and saturated quarternary ammonium cations do not corrode the metals described above upon contact. Many of these are hydrophobic, thus corrosion due to moisture ingress in the primary seal is also reduced.

Corrosion resistant alloys of silver for use in automotive mirrors are described in U.S. Pat. No. 5,818,625 and in US patent applications 20030227250 and 20040005432 where silver is alloyed with gold, palladium, rhodium, platinum copper, silicon, copper+zinc and copper+tin and several other materials. These alloys may be used with this invention but a more preferred alloy for electrochromic mirrors is of silver with at least one lanthanide element. Lanthanides have atomic numbers from 57 to 71 in the periodic table, and a particularly preferred lanthanide is neodymium. The preferred doping percentage of lanthanide is less than 15%. Corrosion resistant aluminum alloys may also be used for mirror electrodes. An advantage of aluminum is lower cost as compared to silver. Although "aluminum alloys" is listed as a category in U.S. Pat. No. 5,910,854, specific elements to which aluminum may be alloyed for EC mirror application is not given, which need to have superior corrosion resistance, particularly that resist non-reversible electrochemical activity. Preferred alloying elements for this application are manganese, iron, silicon, magnesium, zinc and chromium. Of these particularly preferred are manganese, magnesium, silicon, chromium and zinc. These alloys may also have copper, but aluminum alloyed only with copper are not too durable to corrosion. There may be more than one alloying elements, and some preferred combinations are additions of magnesium+manganese, magnesium+silicon or magnesium+zinc. Preferred combinations also include further addition of chromium, to magnesium+silicon and magnesium+zinc. Some of the preferred alloys of aluminum are 3xxx, 5xxx and 6xxx series. Some of the preferred grades in these classes are 3003, 3004, 5005, 5050, 5052, 5083, 5086, 5454, 5456, 6005, 6061, 6063 and 6101. The alloys may be coated by sputtering or evaporation on to the substrates, and may use the ion assistance before or during the coatings deposition as discussed earlier. Generally, the concentration of alloying materials in aluminum is less than 15% and more preferably less than 4%. In silver the concentration of the alloying elements is generally also less than 15%. All percentages for alloys in this disclosure are molar (or atomic).

Busbars and Methods to Form them

Figure 6:
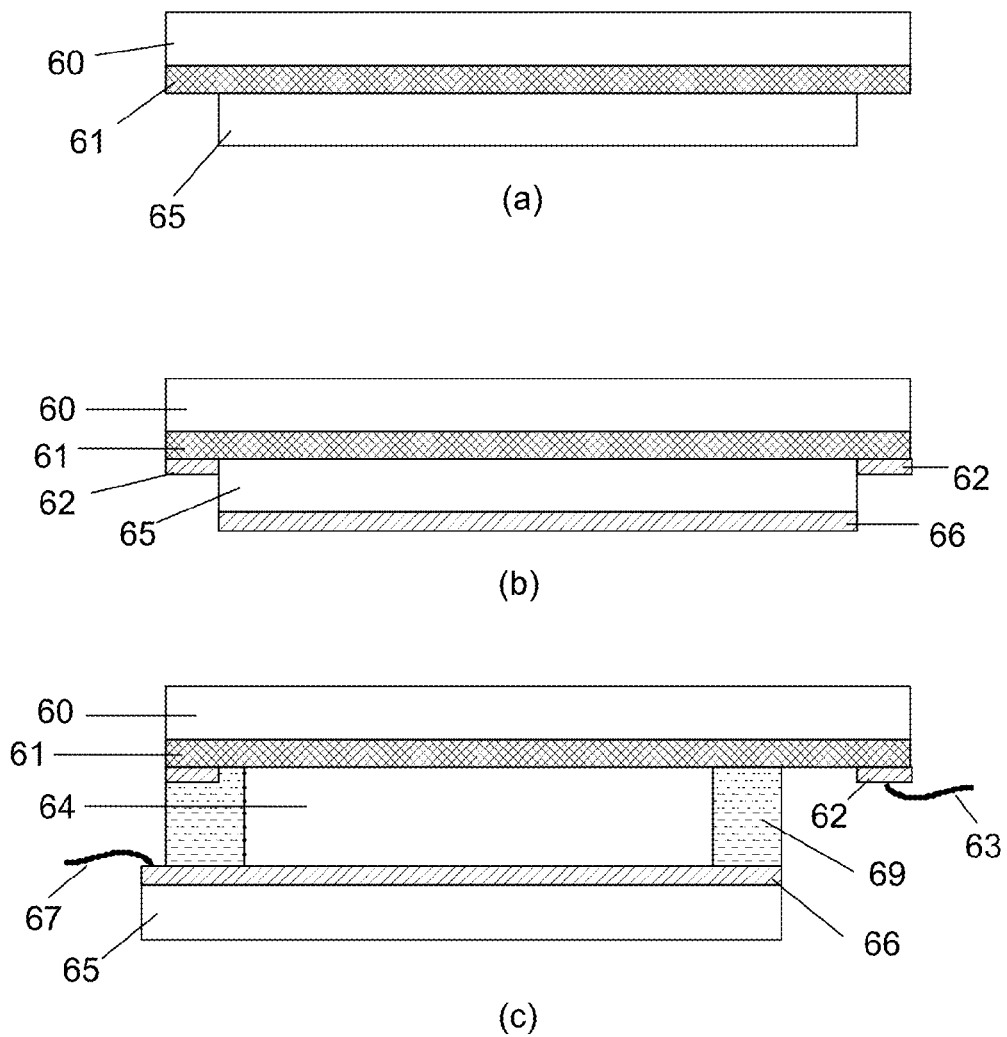
FIGS. 6a 6b and 6c: Coating and assembly process of a third surface mirror and busbar.

Metal layers may also be used as busbars on the perimeter of the clear substrate. In a preferred process the third surface reflector and the perimeter busbar for the front substrate may be formed in a single operation, as described in U.S. Pat. No. 5,724,187. As shown in FIG. 6a, the front substrate 60 is pre-coated with transparent conductor 61 and the rear substrate 65 for the rear reflector/conductor is placed in a stacked relationship, while exposing most of the perimeter of the conductive coating. This stack is coated with a metal as shown in FIG. 6b. The metal is coated from one side so that it coats the surface of 65 as shown by 66 and also the exposed edges of the front substrate as shown by 62. The back and the front substrates are separated and the rear substrate is flipped so that 66 faces 61 as shown in FIG. 6c. FIG. 6c shows the device which is made using the principles of FIG. 1. Substrate 65 is slightly translated so that after these are bonded using a perimeter adhesive 69, electric connecting wires may be attached to the conductive edges of the two substrates shown by 63 and 67. Electrolyte in the assembled device is shown as 64 which is introduced by backfilling or lamination as discussed earlier. Alternatively there may be notches or corners in substrates so that translation or rotation may expose areas for connection to electrical wires. This method typically yields a good reflector and a conductor, but for most cases this may not be adequate for an all around busbar for the transparent substrate, as it is too resistive due to the thickness limitations of the metal which is deposited. Using PVD, typical metal thickness economically achievable are generally less than 500 nm and usually around 100 nm.

Consider an EC device with a perimeter of 60 cms. A chrome busbar deposited all around the perimeter of thickness of 100 nm will yield a conductor with surface resistance of about 1.3 ohms/square and the resistance of a busbar strip 30 cm long and 2 mm wide will result in a resistance of 25 ohms. The busbar in this geometry and composition will not be too effective when used on a substrate with similar resistivity transparent conductor (transparent conductor measured in ohms/square). This is because when this busbar is connected with a powering cable on a small area (less than 1 cm of busbar width) the potential drop along the busbar will be large. Effectiveness means that it will not be able to promote a uniform coloration and bleach, where the coloration in the vicinity of the connection will be faster and deeper. It is preferred that the resistivity of the busbar for a length equivalent to half the device perimeter and in appropriate width (generally less than 5 mm) should preferably be less than a factor of 2 as compared to the surface resistivity of the transparent conductor. A more preferred factor is 10, and a most preferred factor is 25. The resistivity of the busbar may be changed to conform to these parameters by using a more conductive metal (e.g., aluminum, silver, copper and their alloys), changing its thickness and/or its width.

Many methods may be used to form highly conductive busbars which are formed around the substantial perimeter of the device, and several methods are given in U.S. Pat. No. 6,317,248 where a busbar is formed by wrapping a conductor from the front, onto the edge and finally wrapping around the opposite surface. Substantial perimeter is defined as more than 50% of the perimeter on each substrate. Conductive busbars may also be formed without wrapping over the back surface. For example these may only be limited on one surface or they may continue to be wrapped around the adjacent edge.

For mirrors with third surface reflectors, it is preferred that a busbar be economically formed on the transparent conductor covering more than 50% perimeter, and more preferably 100% of the perimeter. One method to deposit high conductivity busbar on the substrate perimeter is by depositing a silver frit. This process is described in detail in U.S. Pat. No. 6,317,248. Most silver frit processes need a firing temperature in excess of 400° C. For those devices which utilize already formed ITO coatings, it is preferred that the maximum firing temperatures be kept lower than 400° C. and preferably lower than 350° C. so that the conductivity and the optical properties of the ITO are not compromised. Thus those materials and processes are preferred which either melt below 400° C. or are processable below 400° C. More preferably this temperature should be below 350° C.

According to the present invention, busbars can be formed by spray processes comprising of conductive particles with an organic binder may be employed. The interior of the substrate may be masked or the coating process may be such that only the local area for the busbar is coated. The organic binders polymerize or solidify on the substrate. Examples of this are Choshield™ and Choflex™ coatings from Chomerics (Woburn, Mass.). Another preferred way is to use a thermal or a plasma spray process which only uses 100% metal. An example of this is a coating of a tin/zinc alloy (and a process) available as EcoPlate™ 5030 from Chomerics. Thermal and plasma spray coatings from APS Materials Inc (Dayton, Ohio) may also be used to deposit a variety of metals, cermets and conductive ceramics. This uses typically 80/20 tin/zinc alloy where its surface resistivity is 0.005 ohms/square for a buildup of 25 micron thick layer. For this the busbar resistivity with a 30 cm length and 2 mm wide strip would have a resistivity of 0.76 ohms. The melting point of this material is 270° C. This material also has good corrosion resistance such as against salt water spray. Other materials comprising of tin, zinc, aluminum and indium may also be used. Layer thickness for busbar may be any, but the preferred range is from 5 to 50 microns. Since this is a spray process, the busbar may be optionally deposited so that it wraps around the adjacent edge of the substrate to give higher conductivity. Ceramics may also be used as conductive busbars. Usually these comprise non-stoichiometric, usually reduced oxides, e.g., $TiO_{2-y}$, $TiBr_{2-x}$. Where "x" and "y" are positive numbers usually less than 1 and show that these oxides are in a reduced state. One may have to use adhesion promotion layers between the transparent conductors and the sprayed metals. These may be layers of metals such as chromium and titanium which may be deposited by PVD and/or by electroless deposition or by electro deposition. The busbars may be wrapped from one face of the substrate to the adjacent edge or it may continue to wrap around the opposite face as described in U.S. Pat. No. 6,317,248. After connecting the busbars to connectors (via clips, solder or conductive adhesive), they may be protected from scratching and handling, etc., by non-conductive coating formed by any of the standard coating materials. Some of these coating materials are based on urethanes, acrylics, alkyds and epoxies.

Figure 14:
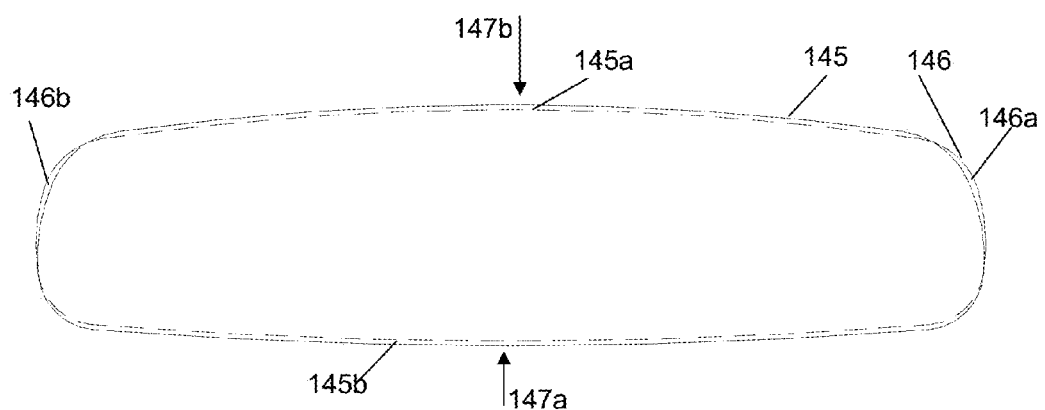
FIG. 14: An interior automotive EC mirror construction showing busbar configuration for uniformly coloring mirror.

Also, according to the present invention, rearview (or interior) mirrors may also be made using an alternative design that mimics the all around bus-bar. In this aspect of the present invention, a third surface reflector/electrode is used with a front surface comprising of a transparent conductor (FIG. 14). This figure of an interior mirror does not show the perimeter sealant only to keep the figure unfettered from concepts not related to the discussion below. The substrate with transparent conductor coating 145 is cut slightly larger (i.e. wider) along the long axis as compared to the reflective surface 146, so that when it is assembled with the other substrate to form a cell, then along the substantial long axis of the device the transparent substrate protrudes outward from both the sides 145a and 145b, so that a metal clip or a busbar may be attached to each side.

This protrusion may also be optionally along one of the ends of the mirror (not shown). When separate clips or busbars are attached to 145a and 145b, they are joined together by wires to a common terminal or to separate terminals. The substrate with the metal reflector is cut so that it protrudes out on at least one of the ends of the mirror. This is where via a clip or a solder is attached. If it protrudes on both of the ends of the mirror (shown as 146a and 146b), one may attach a connector to both areas and then pigtail them together to be connected to a common terminal or the connector may only be attached to one end. The metal clip busbar attached to the transparent conductor is substantially attached to the entire lengths of 145a and 145b. For the reflective surface which is much higher in conductivity a short length of attached busbar in at least one of 146a and 146b is sufficient. As long as the resistivity of the reflective coating (in ohms/sq) is lower than the transparent conductor by a factor of 10 or more, a uniformly coloring device is obtained. Thus one of the substrates (preferably the transparent front substrate) has a busbar substantially around the perimeter (greater than 50%), and the busbar (or other perimeter conductive connector) on the other substrate covers substantially less perimeter (less than 50%). For practical mirror devices the conductivity of the transparent coating on the front surface is generally less than 200 ohms/square and that of the reflective conductor less than 10 ohms/square. For an exterior mirror a similar concept may be used where the width and the height of the mirror are similar. The transparent conductor may be powered from two parallel sides as discussed above, or it may be powered from almost around the perimeter, where the reflector below protrudes out at one or more of the corners so as to attach the busbar.

This scheme of having one busbar (e.g. the busbar on the transparent front substrate) substantially around (equal to or more than 50% perimeter) on only one of the two substrates (which form the cell) allows use of conventional busbar materials to get a benefit of all around busbars for EC devices. This is particularly useful for $3^{rd}$ surface mirrors when the resistivity of the frontal transparent conductor limits the kinetic performance as described above. The usefulness of this concept in providing a uniformly coloring and bleaching mirror depends on the width of the device and the surface resistivity of the transparent conductor. A simple rule where this concept of busbars may be used is where the width (measured in cm) of the device multiplied by surface resistivity (measured in ohms/square for transparent conductor) exceeds 100, and more preferably 120. The width is measured as the maximum width of the active area where the two busbars are separated. For example in FIG. 14, width is the distance between the two arrows (147a and 147b) discounting the width occupied by the busbars and the seal holding the two substrates. For an interior mirror with a width of 5.5 cm and using a front substrate with a transparent conductor coating of a resistivity of 45 ohms/square would benefit from this arrangement as the multiplication of the two numbers exceeds 120.

This arrangement of all around busbar may be used even in third surface mirrors where the transparent conductor has higher conductivity (e.g. between 5 to 25 ohms/square). This scheme may be particularly effective in increasing the bleach speed of the self-erasable EC mirrors available commercially at present. This could be particularly important at temperatures lower than room temperature. The self erasable mirrors bleach by back reaction when the powering voltage is removed or the two terminals shorted. The electrolyte thickness is an important variable determining the back reaction. A lower electrolyte thickness leads to higher back reaction and hence faster bleach. Too high back reaction interferes with the degree of coloration as it leads to higher potential drop within the device and in extreme cases may lead to non-uniform coloration where the color is deeper closer to the busbars at the edges and lighter as one moves away from them. Thus the electrolyte thickness is chosen to give the right balance between coloration and bleach. The back reaction is typically measured by looking at the leakage current (or the steady state current) when the mirror reaches a steady coloration stage at a given color potential. When the transparent conductor is powered from all around, a higher leakage current may be sustained without loosing the coloration or color uniformity. Thus for these devices the electrolyte thickness can be reduced to achieve higher bleach rate. This concept of all around busbars may also be extended for $4^{th}$ surface mirrors (See FIG. 5), where transparent conductors are used as both electrodes, and one of these has a higher conductivity as compared to the other. The transparent conductor that is more conductive has busbars in less than 50% of the perimeter, and the side with lower conductivity transparent conductor has busbars on more than 50% of the perimeter. As shown in FIG. 5, the reflective coating is placed on the fourth surface.

Substrates, Added Functionality Coatings for EC Mirrors

The first surface of the mirror device (see FIG. 5a) which faces the user, may also be coated to impart further functionality. These could be coated with self-cleaning coatings which may be hydrophilic, hydrophobic or have catalytic properties activated by light. The hydrophilic coating keeps the vision clear during fog or rain, as water spreads over the surface in a uniform transparent film. In the hydrophobic coating water beads up and flows away thus keeping the vision clear. Any of these coatings may be used. For hydrophilic coatings it is preferred that the contact angle of water with the coated surface at 25° C., 50% humidity be below 20 degrees. For hydrophobic coating the contact angle under similar conditions of testing should be preferably greater than 100 degrees. The light activated coatings are typically comprised of semiconductor oxides such as titania (see U.S. Pat. No. 5,595,813). For high transparency it is preferred that they have an optical band gap below 400 nm. A preferred titania coating comprises micro or nano-crystals of anatase phase. These coatings generate photo-activated species that can oxidize surface organic impurities and keep the surfaces clean. Multiple layer hydrophilic coatings for use in automotive EC mirrors are described in U.S. Pat. No. 6,447,123 and in WO 03/012540. The outside surfaces may also be coated with high or low index materials relative to the substrate to increase or decrease the reflection. These could also be multiple coatings stacks so as to reduce reflections by destructive interference. Some of these coatings may be combined (e.g., multiple stacks) to result in more than one functionality (such as catalytic activity to oxidize surface impurities combined with hydrophillicity). Inexpensive self-cleaning coatings of titania are deposited by pyrolytic process on glass (see U.S. Pat. No. 6,027,766). Before the deposition of these coatings it is typical to deposit a coating which acts as a barrier coat to stop sodium ions diffusing in the photo-active coating and poisoning its catalytic activity. Catalytic coatings with underlying coatings for barrier coat have not been used for automotive mirrors before. A more preferred and economical route for EC devices which use active coatings is to use glass which has these coatings deposited on one of the surfaces by pyrolytic process. For mirror applications the haze of the coated glass should be below 1%. Care should be taken that this coating does not get irreversibly contaminated or damaged during subsequent processing. The transparent conductor for use in EC device is then deposited on the surface which does not have the active coating and then employed to make the EC device. For EC automotive mirrors only the front substrate needs to constructed in this manner. The use of glass with barrier coat results in an active coating that lasts for a long time for use in automotive conditions, and in addition, pyrolytic coatings are harder and more durable as compared to coatings deposited by other processes. Self cleaning glass is available under the trade name of Active™ (Pilkington, Toledo, Ohio) and Sunclean™ (PPG, Pittsburgh, Pa.). Rear view mirrors comprising ionic liquids in the electrolyte may be integrated in an automotive system with a heater in a similar fashion as conventional electrochromic mirrors. This heater primarily functions to remove frost or dew deposited on the mirror surface. Advantageously, it also overcomes the sluggish response of the EC devices at low temperatures if the mobility of the dyes reduces. For example these can be heated using a heater pad from behind or even imprinting a resistive heater pad on the back of the mirror, e.g., as given for electrooptic mirrors in U.S. Pat. No. 5,808,777 and U.S. Pat. No. 4,584,461. This can be implemented for automotive interior or exterior mirrors, however, the addition of a heater is more common for exterior mirrors. The heater may be self-regulating in terms of the highest temperature as would be in case of a resistive pad utilizing positive thermal coefficient (PTC) mechanism. Information on this can be found from Dupont's Microelectronic materials division (Wilmington, Del.). As an example PTC heaters may be made by depositing polymeric coatings loaded with carbon particles on polymeric sheets such as polyethyleneterephthalate. The heater can be activated when the temperature falls below a certain value, e.g., below 20° C., or it may always be activated to keep the mirror temperature between 40 and 50° C. This will ensure that the mirror kinetics is always similar regardless of the ambient temperature in the mirror vicinity.

Low weight EC devices could be made using ionic liquids. As an example, for automotive mirrors, the substrate thickness could be in the range of 2.5 mm down to 0.5 mm. The two substrates used for making the cavity for the devices need not be the same thickness, they may even have different transparent conductors, e.g., one may be ITO coated and the other tin oxide coated such as TEC glass from Pilkington (Toledo, Ohio), or one of them may have a metallic conductor as described above. Thin substrates have also been used in EC mirrors (generally less than 1.5 mm in thickness). Further, the use of thin substrates has an advantage in non-planar mirrors. If mirrors such as convex or multi-radius are required (e.g., combination of flat and curved regions in the same mirror to eliminate blind spot (e.g. see U.S. Pat. No. 6,522,451), it is easy to bend thin substrates without causing creases and non-uniformities. Thin substrates as described in U.S. Pat. No. 6,195,194 may also be used in this invention.

Also, use of preferred ionic liquids lends itself more favorably to the use of plastic substrates in electrooptic devices as these liquids are inert towards a large number of commercial polymers. Plastic substrates result in low weight and also better impact resistance. An additional advantage of using the ionic liquids is further protection of automotive interiors. In case of a mirror breakage or leakage, the electrolyte would not interact and blemish the interior plastic components such as dashboard. Further, if EC mirrors are made with plastic substrate in the rear and glass substrate in front, issues related to scratch resistance are avoided. When the back substrate is made of a plastic material then a metal coating or a stack comprising of a metal layer is deposited to act both as a reflector and as one of the two conductors in the EC cell cavity. U.S. Pat. No. 6,193,379 describes the use of cyclo-olefins as preferred material for use in EC devices, particularly EC mirrors. We have determined that it is not sufficient for EC devices, particularly automotive mirrors and windows to have substrates made only from cyclo-olefins without meeting some specific thermal criteria. It is important for these polymers to have good dimensional stability, particularly against temperature and moisture uptake. This reduces the issues related to dimensional stability such as stress on seals, warping and keeps the image quality high. In many constructions glass may still be used as the front substrate, thus it is important for the rear substrate to have low expansion to reduce warping with change in temperature. Thus, crystalline polymers are preferred as they have lower expansion. Amorphous polymers with high Tg may be used as long as Tg is higher than any of the processing, testing or use temperatures. It is preferred that amorphous thermoplastic polymers have Tg in excess of 120° C. (as measured by differential scanning calorimeter at 10° C./min heating rate) and moisture absorption less than 0.1% (as measured by ASTM D570). Thermoplastic crystalline polymers or thermoset polymers must have heat deflection temperature (HDT) greater than 100° C. and moisture absorption of less than 1%, and preferably less than 0.1%. HDT is measured according to ASTM D648 at 0.45 or at 1.8 Mpa. Thermal expansion may also be reduced by adding mineral fillers and/or glass to the polymers. Linear thermal expansion coefficient of preferred mineral fillers and glasses should be less than $10^{-5}/°$ C. in the range of −40 to 120° C. These fillers may be typically present in a range of 10% and more preferably 50% by weight. The fillers may also be nano-particles, e.g., surface treated inorganic clays described in the sealants section. These fillers are effective in terms of imparting superior barrier against fire and moisture and or gas diffusion. Filled plastics may employ additives which result in high surface finish. These additives may be other low viscosity polymeric materials which during processing migrate to the surface.

Some grades of cyclo-olefins that have high Tg are Topas 6013, 6015, 5013 and 6017 from Ticona (Summit, N.J.) and Zeonex RS820 (Zeon, Tokyo, Japan). Generally, high temperature resistant polymers such as polyarylates, polysulfones, aromatic polyesters, polyphenylene oxide, polyketones, polyether ketones and their blends will also be suitable. The polymers may also have inorganic fillers. Some of these may be colored or opaque, but they will be still suitable for back substrates in mirrors if they are metallized for use as one of the electrodes. For the back substrate that does not have to be transparent a low cost option is the use of engineering polymers such as acetal polymer (e.g., Celcon® MT8U01 and M15Hp from Ticona) where electrode conductivity and reflectivity is provided by a metal coating. Substrates (flat or curved) are preferably molded from thermoplastic or thermoset polymers. Alternatively, these may also be cut from extruded sheets which may be curved by thermoforming. Some examples of thermoset polymers are sheet molding compounds (SMC) and bulk molding compounds (BMC) used extensively for class "A" finish on automotive panels. These may be further treated with moisture and/or oxygen barrier coatings. These polymers may even have oxygen scavenger additives, e.g., Amosorb™ from BP Amoco Chemical Co (Chicago, Ill.), which are typically added in a concentration range of less than 2%. Some polymers may require tie layers to ensure good adhesion of the metallic coatings on to them. The tie layers may be inorganic, organic or may be a surface modification, e.g. as discussed earlier in the section "EC mirror electrodes and methods to deposit them". The inorganic tie layers may be metal oxides or a different metal. Some examples of organic tie layers for polyolefins are maleic anhydride grafted polyolefins and acrylates, and silane coupling agents. Grafted polymers for improving adhesion are available under the trade name of Amplify™ from Dow Chemical (Midland, Mich.). Surface modification for improving adhesion may also be done by variety of treatments such as plasma treatment, corona treatment, flame treatment, treatment with strong acids and/or bases.

Further, high moisture absorption prone polymers may be used after moisture barrier treatments. These polymers may be treated with additional layers to give an oxygen barrier as described in U.S. Pat. No. 6,193,379. Incorporation of additional layers increases the product cost. When pin hole free metallic coatings or oxide coatings (such as transparent conductors) are deposited which are either one of conductor or a reflector in the device these will form a good oxygen barrier, thus avoiding the need for additional barriers. However, with electrolytes comprising of preferred ionic liquids, moisture is less of an issue.

Sealants and Sealing of Devices

The sealing of EC devices can be done using several methods. Generally for liquid electrolytes a cell cavity is fabricated by depositing an adhesive along the perimeter of one of the substrates. Spacer beads are added to the adhesive and/or sprinkled on the substrate. The second substrate is lowered onto the first one and clamped and then the adhesive is cured yielding a hollow cavity or chamber. To fill the cavity with a fluid at least one gap is left in the sealant or at least one hole is made into one of the substrates. The cavity is filled using this gap or hole and then this is plugged with another adhesive, a solid plug or combinations thereof. The adhesives may be radiation (e.g., UV) and/or heat cured. In those cases where the electrolyte is preformed as a solid sheet, the electrolytic sheet is lowered onto one of the substrates but kept clear of the peripheral regions. An adhesive bead is put around the electrolytic sheet and the second substrate is lowered onto the first substrate sandwiching the electrolyte and the adhesive bead. This is then laminated to both cure the adhesive and bond the electrolyte to the substrates. Alternatively, one may laminate the electrolyte between the two substrates and then apply an edge sealant.

Spacer beads may be made out of a variety of inorganic and organic materials. These may be glasses or crystalline materials. Some choices in non-conductive inorganic materials are various crystalline minerals such as alumina, zirconia, titania, silica and tantala beads, and glasses such as compositions based on soda-lime and borosilicate, etc. Hollow beads, or those materials which expand during processing (such as seal curing at elevated temperature) may also be used. Hollow beads made out of glass (Scotchlite™ glass bubbles) and from ceramics (Zeeospheres™ and Z-Light™ microspheres) are available from 3M (Minneapolis, Minn.) and expandable beads are available from Expancel (Duluth, Ga.). When the mirror size gets bigger, typically if the minimum average distance between the opposite side of the sealant starts exceeding 7.5 cm, one may use beads which are sprinkled on to the interior of the cavity formed by the two substrates. Spacers may also be added to the interior of those devices where the substrates are curved, such as non-planer automotive mirrors or those devices that use thin substrates (e.g. less than 1.5 mm) or those which are less rigid (e.g. which have a Young's modulus of less than 2 million psi). This may be done while spacers are added to the edge sealant. It is preferred that the spacers which are added within the cavity are of a refractive index similar to that of the electrolyte. Alternatively these spacers may also be solubilized or dispersed in the electrolyte matrix. Once the edge sealant is cured and the cell filled with the electrolyte, the cavity spacing is generally maintained. Beads made from polymers which were described earlier for solidification of electrolyte by forming two phase systems, or used for viscosity modification may be used for this purpose.

U.S. Pat. No. 5,233,461 describes the use of organic thermoplastic sealants. Typically these sealants are cut as perimeter gaskets from thin sheets of a thermoplastic polymer which is then laminated between the two substrates using heat and pressure. An example of thermoplastic edge sealant is Surlyn™ ionomer (from Dupont, Wilmington, Del.). Sheets of thermosetting adhesives can also be used in a similar fashion. Examples of these sheets are available from 3M (Minneapolis, Minn.) as structural bonding tapes (e.g. number 9244).

The peripheral area of the EC cell forming substrates may be primed to improve its adhesion with the sealant. Alternatively, adhesion promoters may be added to the sealant itself. The adhesion promoter in the primer or the one added to the sealant must be compatible both with the substrate and with the sealant. Typically the adhesion promoter molecules (also called coupling agents) where one end reacts or bonds with the substrate and the other end reacts or bonds with the sealant are preferred. This is known in the art, and as an example silanes are the most commonly used adhesion promoters for glass, metals and metal oxide surfaces. A good reference for such issues including primer formulations is "Silane Coupling Agents" by Edwin P. Plueddemann, Plenum Press 1991. Non-silanes such as zirconates, titanates and aluminates are available from Kenrich Petrochemicals (Bayonne, N.J.). Typical silane coupling agents for use with epoxy adhesives have one end which is reactive or compatible with the epoxy resins, some examples of the reactive ends are epoxy, mercaptans and amines. Specific examples of these from Dow Corning (Midland, Mich.) are Z6020 (amine) and Z6040 (epoxy); Silquest A-189 is a mercaptan silane from Witco (South Charleston, W. Va.). For acrylic adhesives including those which are UV cured a methacryloxy functionalized silane is preferred, e.g., A-174 from Witco. More details on surface treatments, primers, adhesion promoters and adhesives can be found in "Handbook of Adhesives & Sealants" (Edward M. Petrie, McGraw Hill (1999)). Some application notes can also be found in PCT application WO 00/17702. These silanes may also be added to sealants prior to dispensing so that a separate step of priming is avoided. These primerless sealants may be used for use in electrooptic devices. Generally when these are added to the sealants directly, their percentage by weight is usually lower than 10% of the total sealant, and preferably lower than 2%. According to this invention, improved primerless adhesives may be prepared by adding pre-hydrolyzed silanes to the sealants. These sealants have good environmental resistance. Pre-hydrolysis of silanes is typically done by adding acidified water (preferred pH between 2 and 4). The amount of water added should be sufficient to hydrolyze on an average 0.1 to all the alkoxy groups, and the preferred range being 0.5 to 2 of the alkoxy groups. These are then mixed for a period for hydrolysis to take place before adding them to the resin (sealant). The period for hydrolysis may be from several minutes to many days and is dependent on the pH, temperature and the quantity of water added. The hydrolysis reaction may be carried out at room temperature or at elevated temperature.

From a durability perspective and in order to pass qualification tests (listed below), a seal with high Tg (glass transition temperature) is preferred. Tg may be measured by differential scanning calorimeter at a heating rate of 10° C./minute, and preferably it should be greater than 120° C. and more preferably greater than 130° C. and most preferably greater than 140° C. High Tg ensures that the permeability to oxygen and water vapor is low and that the devices are able to pass elevated temperature and/or humidity tests without warping or causing excessive expansion at the adhesive joints. For example U.S. Pat. No. 6,245,262 lists tests for automotive mirrors. These tests may also be used for testing devices for other applications. These tests are: 96 hours or longer in boiling water, 720 hours or longer at 85° C./85% RH and a steam autoclave test at 121° C. (15-18 psi) for 144 hours or longer. Of these the autoclave test is considered to be most challenging. It may not be necessary that the Tg of the adhesive needs to be higher than the test temperature to pass the tests, but it is preferred this way so that the diffusion of elements such as water and oxygen into the device is kept low during these tests.

From a processability perspective, it is desirable to use sealants which have a long pot life. The long pot life ensures consistency in manufacturing and less interruption as the viscosity change over a period of time is lower. These sealants may be formulated in one location and may be transported to other locations without using expensive refrigeration techniques. Epoxy resins which are cured using latent curing agents will result in long pot life. Use of latent curing agents for sealing EC devices is described in U.S. Pat. No. 5,724,187. In this patent those epoxies are described which are bifunctional and cured with latent curing agents. These types of epoxies only result in low Tg (generally lower than 100° C.) and the resulting devices do not stand well to elevated temperatures or elevated temperature testing such as autoclave testing for automotive mirrors. The pot life at 25° C. room temperature of the formulations with latent curatives should exceed 12 hours, preferably 7 days and most preferably 4 weeks. Latent curing adhesive in U.S. Pat. No. 5,724,187 discusses in detail using Epon 8281 (from Resolution Performance Products, Houston, Tex.) and Ancamine 2014G (From Air Products, Allentown, Pa.) for automotive mirrors. According to the product brochure from Air Products this material in cured state has a Tg of only 110° C. Further, the most preferred sealants are those with a glass transition temperature of less than 100° C. PN23 (From Ajinomoto Co, Inc, Paramus, N.J.) as a latent curing agent is listed but it is not preferred as it has a higher Tg. This patent had a list of many curing agents with long shelf lives, but no data was given to demonstrate if these passed the tests. U.S. Pat. No. 6,195,193 discusses curing epoxy DEN 431 (from Dow Chemical, Midland, Mich.) with Ancamine 2049 (from Air Products). The pot life of the curing agent in the product brochure with bifunctional epoxy is listed as 400 minutes and period in which the resin may be processed would be even shorter. Thus when it is used with a higher functionality epoxy such as DEN 431, the pot life will be still shorter.

We have determined that most desirable combination of properties for the sealant is long pot life, high Tg and good barrier for moisture and oxygen and sustain the above tests, in particular, the autoclave test. Expansion coefficient for bonding glass substrates may also be an issue which is typically reduced in organic adhesives to match glass by adding inorganic additives. The inorganic additive content may be low (lower than 30%) if nano-particles comprise the inorganic additive package. When no nano-particles are used then the inorganic content should preferably be greater than 30% and more preferably greater than 35%. As will be discussed later preferred adhesives of this invention employ anhydride curing agents. Examples of latent curing agents are Ancamine™ 2014, 2441 and 2442 from Air Products (Allentown, Pa.). All of these materials are solid at room temperature. However, when these are cured with Bisphenol A type epoxy (e.g., Epon 828 and 8281 from Resolution Performance Polymers (Houston, Tex.) and DER 331 from Dow Chemical Co (Midland, Mich.) result in Tg's lower than 120° C. Higher latency can also be achieved by using dicyandiamide (DICY) curing agents, e.g., Amicure™ CG-NA, CG-325, CG-120-0, CG-1400 and Dicyanex 200-X from Air Products. DICY curing agents are solid at room temperature. The use of DICY with Bisphenol A epoxies listed above results in a desirable glass transition range. Mixed curing agents can also be used such as a mixture of Ancamines described above and the DICY curing agents. The use of these materials, their proportions and curing conditions are described in product literature from Air Products. Other accelerators can also be used for DICY, e.g., imidazoles, examples of these are sold under the trade name of Curezol and Imicure from Air Products. The preferred imidazoles are Curezol 1B2MZ, Curezol 2E4MZ, Curezol 2MA-OK, Curezol 2MZ-Azine, Curezol 2PHZ-S, Curezol 2PZ, Curezol 2P4MZ, Imicure EMI24 and Imicure Imidazole. The more preferred of the imidazoles are solid powders at room temperature, which are Curezol 2MA-OK, Curezol 2MZ-Azine, Curezol 2PHZ-S, Curezol 2PZ, Curezol 2P4MZ and Imicure Imidazole. These imidazoles may also be used as catalysts for latent formulations when epoxies are cured using anhydrides. Yet other accelerators for DICY are substituted ureas, e.g., Amicure UR, Amicure UR-S and Amicure UR2T from Air products. Many of the above mentioned imidazoles may also be used as sole curing agents. Solid latent curing agents may also be purchased from Ajinomoto Co, Inc (Paramus, N.J.) under the trade name of Ajicure PN-23, PN-H, PN-31, PN-40, PN-23J, PN-31J, PN-40J, MY-24 and MY-H. The PN is typically used with DICY curing agents and the MY series with anhydrides or either of them may be used as sole curing agents. DICY and latent curatives have also been mixed in a single package, e.g., AH-154 and AH-162.

The use of latent curing agents which result in high Tg's, and are filled with nano-particles or have high inorganic content, and which pass the autoclave test are novel for electrooptic devices, and in particular EC and EL devices. Using Ancamine latent curing agents as sole curing agents, Tg may be increased by using higher functional epoxies such as those based on Novolac e.g., EPON Resin 160, EPON SU3 and EPON SU2.5 (from Resolution Performance Products, Houston, Tex.), DEN 431, DEN 438 (from Dow Chemical in Midland, Mich.)) and THPE-GE from Dupont Electronic Technologies (Danville, Calif.). The higher functionality resins may also be mixed with bifunctional epoxies, e.g., THPE-GE and EPON SU3 is preferably mixed in a proportion of less than 25% by weight in a bifunctional epoxy such as EPON 828 or EPON 8281. Multi-functional epoxy resin for the purpose of this invention of the resin is defined as the average number of reactive (epoxy) groups greater than 2. A mixed resin with an average functionality greater than 2 would be considered multi-functional for this invention. A desired curing temperature is in the range of 100° C. to 200° C., and more preferably between 120° C. and 150° C. The curing time may vary from several minutes to several hours. All sealants of this invention may also be cured using microwaves, which may be optionally followed or cured at the same time by thermal curing. Microwave and or thermal curing may also be assisted by other forms of radiative curing such as infra-red. Typical fixed microwave frequencies which may be used are 215 MHz, 434 MHz and 2.45 GHz. Variable microwave frequencies (in the range of 100 MHz to several GHz) may also be used, and they may be tuned around a particular frequency to increase the absorption of the microwaves. The tuned frequency is dependent on the material composition including additives. At these temperatures the solid curing agents must melt and react. Typically the latent curing agents or accelerators are ground to a fine solid powder (usually less than 20 microns in size and more preferably less than 10 microns in size) and mixed with the liquid epoxies. These have poor solubility in the epoxy liquid resins at room temperature and this promotes the latency. During cure cycle, at elevated temperature, these melt and become soluble and more reactive. Another way of increasing latency while using bifunctional or higher functionality epoxies is by using these curing agents as catalysts for epoxy/anhydride reactions. Anhydride curing agents are generally low viscosity liquids, thus it is easy to add higher inorganic contents as they can be easily wetted and mixed well in the sealant. Those anhydride cured sealants which result in Tg of more than 120° C. are preferred. The above-mentioned Ancamine latent curing agents and those from Ajinomoto Inc may also be used to accelerate those reactions where the curing is done by anhydrides. Some examples of liquid anhydrides are nadicmethyl anhydride, methyltetrahydrophthalic anhydride and methyl hexahydrophthalic anhydride. Low flammability characteristics to the seals may be imparted by using halogenated seals. A part or all of the epoxy resin may be substituted by a brominated epoxy resin (e.g., DER 530-A80 from Dow Chemicals). More UV stable epoxy resins which result in high Tg are cycloaliphatic resins such as Cyracure 6105 and 6110 from Union Carbide (Danbury, Conn.). High Tg may also be obtained by curing bifunctional epoxies such as EPON 828 and DER 331 with PN-23. Typically the shelf life of anhydride cured epoxies utilizing MY-24 and MY-H catalysts is superior.

The adhesives may also comprise colorants (e.g., non-conductive carbon black), viscosity control additives (e.g., Fumed silica, such as Cab-O-Sil™ TS 720 from Cabot Corp), mineral fillers (e.g. calcium carbonate and silicates) coupling agents, oxygen scavengers and spacer beads. Oxygen scavengers are described in the substrate section. Commercial fumed silicas are amorphous. The mineral fillers should preferably be coated with coupling agents such as amino and epoxy silanes for use in epoxy adhesives. The size of the fillers should be smaller than the spacer beads. It is preferred that the formulated epoxy mix should be thixotropic and/or have a viscosity higher than 100P or preferably higher than 1000P. This keeps all the fillers and/or solid curing agents suspended in the formulated epoxy mix and also provides control of flow, so that when the substrates are mated with the epoxy sandwiched between the two the quality of the adhesive lines are smooth and of the desired width. This width is usually dependent on the application and may be as wide as one cm to about 3 mm for large windows and is about between 1 to 6 mm for automotive rear-view mirrors.

Epoxy resins may also be stabilized against UV degradation by adding UV stabilizers, crystalline nanoparticles of metal oxides. UV stability is needed when the sealant may be exposed to the elements, especially for those mirrors where flush look is required rather than a molded bezel to cover the perimeter. Many of these additives may be added together. Some examples of UV stabilizers are UVINUL 3000 (from BASF, Parsippany, N.J.), Tinuvin 213 and Tinuvin 770 (from CIBA Specialty Chemicals, White Plains, N.Y.). Examples of nano-particle sized oxides, which block UV, are titanium oxide, cerium oxide, copper oxide and zinc oxide. Nano-particles for seals should have at least one dimension smaller than 100 nm. As an example titanium oxide particles may be purchased from Dupont (Wilmington, Del.) under the trade name of Ti-Pure R960. A source of several metal oxides is Nanophase Technologies (Romeoville, Ill.) available under the trade name of NanoTek™ and from NanoProducts (Longmont, Colo.). Typically the addition of the UV stabilizers is below 20% by weight of the weight of the epoxy resin in the formulation. These seals may be clear, colored or opaque. Typically the colors are considered dark when their colors expressed on a L*a*b* scale, and the value of L* is less than 30. It is preferred that these seals have a value of L* of less than 60 where an L* value above 45 is considered light coloration. It is also preferred that these seals be opaque or diffuse scattering. This is so that in the darkened state of the mirror, specular reflections from these areas is negligible if it is in the viewer's vision. The scattering as measured by haze value should preferably be greater than 20% and preferably greater than 30%. Haze may be measured by bonding two transparent substrates with an adhesive film of the same thickness, which would be used in the application, using ASTM D1003. Haze values greater than 30% is considered diffusing and may be measured using ASTM E167.

Crystalline nano-particles have other advantages as well. These can provide shrinkage control in curing, high barrier properties for diffusion of electrolyte, water, air, etc., increased Tg and also flame retardance (Wang, Z., Massam, J., Pinnavaia, T. J., "Epoxy Clay Nano-composites" in Polymer-Clay Nanocomposites, Pinnavaia, T. J., Beall, G. W., editors, Wiley, New York, 2000). Some specific examples of nano-particle clays from Nanomer® from Nanocor (Arlington Heights, Ill.); surface treated talcs from Argonne National Laboratory (Argonne, Ill.) and Geramite® and Cloisite® from Southern Clay Products (Gonzales, Tex.). These are crystalline inorganic clays with plate like structures, and the Nanocor®, Geramite® and Cloisite®, materials are based on montmorillonite mineral. Typically the clays are surface modified to replace sodium ions by alkylammonium ions so that they are compatible with the organic resins and are able to exfoliate in to thin flakes. The thickness of these clays is generally about 1 nm (for completely exfoliated mineral) and their width and length are usually less than 1000 nm. These are typically used in a range of 2 to 50 percent by weight of the resin including curing agent. For example a grade more suitable for use with epoxy materials are Nanomer® I.28E Nanomer® I.30E and Cliosite30B. Nanomer® I.28E is a onium surface modified mineral and also suitable for anhydride cured epoxies. The sealants may also comprise nanoparticles comprising silsesquioxanes to impart many of the properties which are also imparted by nano-clays discussed above. These are nanoparticles on a scale of large molecules and include inorganic cages (generally of silicon oxide) with surface groups which are reactive or compatible with organic resins. These are available for incorporation in sealants as Polyhedral Oligomeric Silsesquioxanes (POSS) from Hybrid Plastics (Fountain Valley, Calif.). As an example a POSS material for incorporation in epoxy resins is EPO408. These POSS materials may be substituted for the clays or may be added along with them. A typical concentration range is less than 5% by weight of the resin and preferably less than 2%. These materials may be used with other ingredients described above including other mineral fillers, colorants, fumed silica, etc. These additives may also be incorporated in plug seals (for plugging the fill hole) which are typically cured by radiation such as UV.

The area where the clip busbars are attached to the electrodes may also be sealed after the attachment of the busbars. This prevents moisture ingress in this area and also keeps the busbars mechanically tied against vibrations etc during product's use. Usually the sealants are low viscosity materials, generally lacquers, paints and solgel coatings which may flow around the clip. Prior to the application of these materials a coating of adhesion promoters may be applied, such as silane based primers discussed above, e.g. amino silanes may be used for epoxies and urethane based sealants. These sealants may be epoxies, urethanes, silicones and alkyd resins which may be thermally cured or cured by radiation. These may be flexible or rigid, and as an example may be comprised of epoxy compositions which were discussed for the main sealant. Their viscosities for application may be lowered by reducing inorganic fillers, or adding extractable solvents. Silicones and urethanes may also be room temperature vulcanizing (RTV) type where the materials cure by interaction with ambient moisture. Another class of materials suitable for this are hot glues, including those which after dispensing provide immediate handling strength upon cooling and then continue to cure or cross-link with time as they interact with ambient moisture, UV radiation, or due to a reaction with a material present on the surface (e.g. included in the primer) which activates the curing reaction. An example of hot glues which cross-link after dispensing are Jet-Weld® adhesives from 3M (Saint Paul, Minn.), a preferred adhesive from this class is TS-230.

Displays and Indicators for Mirrors

Active Display in EC Mirrors

Displays are typically provided in EC mirrors for conveying additional information (U.S. Pat. No. 4,882,565). Active displays in this context are those which are either capable of changing the information being displayed or they may be turned-off or turned-on. These displays may be in the mirror casing or in the mirror area. In interior mirrors the display may provide information on direction where the vehicle is headed (compass), amount of gas remaining, tire pressure, inside and/or outside temperature, internet communicated information, any warning or status signals such as open door, safety bag, etc. The displays in the outside mirror may provide blind spot information for the driver, or the turn signals for those cars in the vicinity of the vehicle without distracting the driver, directions from a GPS system and so forth. The features described below are applicable to all mirrors made by electrolytes comprising of ionic liquids.

When these signals are provided in the mirror area, the display is typically placed behind the mirror. For a fourth surface mirror a small area is cleared of the mirror to which the display is affixed with a transparent adhesive. Alternatively there may be pin holes in the reflector or it may be partially transparent so that a display located in the back may be seen through the layer when it is activated. The displays as described in prior art, are generally fluorescent, inorganic LED's, organic or liquid crystal types. However, none of these describe displays which are formed on one of the substrates, or formed on a flexible film and bonded onto them.

For third surface mirrors, where the reflector and one of the electrodes are the same, there are other methods for providing an optically transmissive window while still keeping the conductivity in that area. One method is to use a transparent conductor coating on or below the reflective layer. In either case during the reflective layer deposition a small area is masked for the display or it is removed from this area after deposition. In yet another method, the reflective layer is made partially transmissive by controlling its thickness so that a bright display on the back of the mirror is visible (U.S. Pat. Nos. 5,724,187; 6,512,624; 6,356,376; 6,166,848). This partial transmissivity may be for all of the reflector or only in the window area. Yet another method is to remove the reflector partially so that part of the reflector is left as fine conducting lines which bridge with the continuous part of the reflective layer (U.S. Pat. No. 5,825,527) so that the area for the display is substantially devoid of the reflective conductor. This is created by removing the reflective coating by a laser which is moved in several lines in that area. The non-conductive areas between the lines are about 0.005 inches wide. This process is expensive, as the laser has to be moved linearly to cover the entire area. In addition the residual reflector lines may not be visually appealing for some displays. The width of the lines should be less then 0.005 inches for most automotive mirrors as discussed below. These lines may be parallel with similar width and spacing, or they may also have variations to avoid any optical interference effects. These may also be a set of lines running in different directions giving rise to a mesh.

In one preferred method the reflector is removed (or not deposited) from the display area completely, and conductive lines (or a mesh) is deposited by a separate process in this area to bridge the conductive reflector on its perimeter. This can be processed by either depositing these lines (or mesh) prior to the deposition of the reflector layer or after the reflector layer deposition. The width of the lines (or the lines forming the mesh) should be so chosen so that these are invisible to the eye. Typically, the eye is unable to see lines which subtend an angle of about 0.01 degrees or less. This means depending on the average distance between an occupant and the mirror, the line width can be calculated. For example a mirror located at 45 cm from the eye of a driver, the line width at 0.01 degrees corresponds to 79 microns. Depending on the mirror distance this number would vary. For the purpose of this invention a preferred subtended angle is less than 0.015 degrees. Thus any width given by this calculation which is difficult to discern by the eye or less than 125 microns width is preferred. To ensure that these lines are invisible, it is preferred that the distance used is an average from the eyes of a driver or a passenger, whosoever is closer. The conductors used to form these lines may be reflective or absorptive and may appear as translucent, opaque, dark or even diffusely scattering. Since the visibility of these lines is kept to a minimum, their optical properties are not that important. The line spacing may be similar to the line width or different. These lines may be silk-screened economically using silver paste or other conductors. These are available from Dupont Electronic Materials (DEM) as Silver Thick Film Compositions 1991, 1992, 1993, 1997, 7713 and Solamet Photovoltaic composition as E64885-52A and from Ferro Inc (Santa Barbara, Calif.) as FX 33-246. These may also be platinum and gold bearing conductors and inks from DEM and Englehard Electronic Materials (East Newark, N.J.). Engelhard also uses inks in organic media comprising of platinum and silver particles. These may also be made out of coating materials from Chomerics described earlier or may be conductive adhesives with silver, silver alloy or nickel particles. Formulations containing inherently conductive polymers may also be used as long as these are inert from an electrochemical perspective in the voltage range of mirror operation. These lines may also be formed using micro-photolithography using Fodel materials and process (or equivalent) from Dupont. Some Fodel photoprintable conductors are DC 201 and DC010.

In another novel concept of the present invention, these lines or patterns may be preformed and prepared as individual patches on a releasable tape. A z-axis conductive adhesive is applied on to this and then a bottom release layer is applied to encapsulate this. In the mirror assembly, this patch is placed over this area after removing the bottom release layer. After the patch is affixed (either pressure sensitive adhesion and/or followed by curing), the releasable tape is removed thus exposing the conductors. Particularly in this invention use of acrylic adhesives inside the device may be acceptable as the ionic liquid comprising electrolytes will not degrade or plasticize them. In any of these the total thickness of the lines and adhesives should be less than the electrolyte thickness. Further, in some cases it may be preferred to match the appearance of the lines (color and reflectivity) to that of the mirror.

When emissive displays are used in the mirrors it is preferred that the color of the display (or its emission color) is similar to the mirror in the colored state. As an example a green color display is preferred if the mirror turns green when activated. This keeps the brightness of the display less affected even when the mirror dims. In other words the emission characteristics of the display should preferably be matched to the optical region where the mirror transmission is maximum in the colored state. Thus this simple scheme may not require sophisticated control of the display intensity with changing mirror transmission as described in U.S. Pat. No. 5,416,313. The display intensity may still need regulation based on the ambient light so that it is easily visible during the day and night without causing glare. As an example the intensity of the display may be decreased at night, and this decrease may be signaled when the headlights are turned on.

Emissive displays which are used as EC devices in EC mirrors are typically inorganic LEDs, fluorescent or plasma displays (e.g. see U.S. Pat. No. 5,724,187) and organic displays. As discussed below it is advantageous to use organic displays due to their low voltage, low power, high efficiencies, availability in a variety of colors and low potential cost. Displays may also be formed inside the two surfaces confining the electrolyte. Recently thin film displays made out of organic materials including polymers have been commercially introduced. These displays may be activated below 20 volts, the preferred voltage for activation in this invention is below 10 volts. This is advantageous as displays could share similar driving potentials as EC circuits, further if such displays are integrated inside the mirrors as described below, they would not generate high fields. Principles of organic displays based on small molecules are described in Tang, C. W. et al, Applied Physics Letters, Vol 51 (1987) p-913 and those based on polymers in Friend, et al, Nature vol 347 (1990) p-539. Such displays may be assembled on the first, second, third or fourth surfaces (see FIG. 5a for definition of surface numbers). Surfaces 2 and 3 are inside the cavity between the two substrates. To keep the device thickness lower than the gap between the substrates, it is preferred that the device be directly formed on one of the substrates by depositing the active layers which form the display rather than assembling these devices on another substrate and them bonding them to the substrates being used to form the EC devices (e.g. see U.S. Pat. No. 6,356,376). Formation of these devices also eases the electrical connectivity of these substrates to the powering sources to conductive coatings rather than connectors. The conductive coating for powering the mirror on the second or the third substrate may also be used as a conductor for this display. It is preferred that in that case the electrode area for the display be isolated from the mirror area by creating a non-conductive deletion line using a laser treatment. Laser and chemical treatments to remove and pattern conductors are well known.

Figure 7:
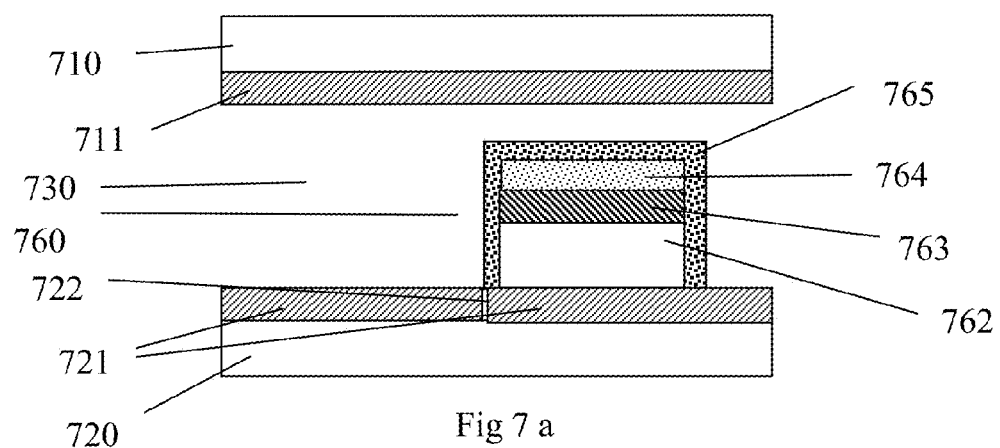
FIGS. 7a and 7b: Organic display integrated with an EC device.
Figure 7:
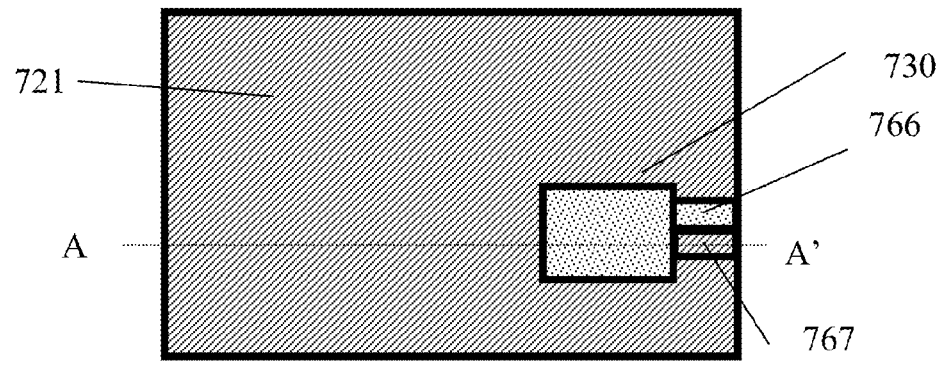

FIG. 7a shows an EC device where an organic display is formed on the second surface by a sequential deposition of layers. The EC cavity is based on the principles of the Device in FIG. 1. 720 is the first substrate which has a transparent conductive such as indium-tin oxide (ITO). This layer is etched by a fine line 722 so as to electrically isolate an area for the display and an area to provide connectivity from the perimeter. Instead of etching an area, an electrically isolated area may be created by depositing an insulating layer followed by ITO and the rest of the organic light emitting stack as described below. The second substrate is 710 and it has a reflective conductor 711. This is a third surface mirror. As discussed earlier this could have been a window or a $4^{th}$ surface mirror if desired. The display is formed on layer 721 by sequential deposition of several layers 762 (hole transport layer), 763 (electron transport layer), 764 (cathode) and then 765. Layer 765 is an encapsulation (or a dielectric) layer which protects the underlying layers electrically and from the electrolyte. Since, this display is within the EC device it need not be sealed from oxygen or moisture, as the main seal of the EC device protects the interior from these materials. If hydrophobic ionic liquids are used in the electrolyte, then the interaction of the electrolyte with any of the organic EL layers is severely reduced. Alternatively, a protective dam may be built around the display so that the electrolyte does not come in contact (e.g. see U.S. Pat. No. 5,253,109) with the display. The plan view of the substrate 720 with the display without the encapsulation layer 765 looks schematically as shown in FIG. 7b. The display area is connected by a fine line of isolated 721, labeled as 767 to provide the power to the display as anode. The cathode 766 similarly is isolated from 767 and 721. The cathode covers the display area (see 765 in FIG. 7a) and wraps around the side of the various layers and continues as 766 in FIG. 7b). A section taken at A-A' will resemble the view in FIG. 7a. For those displays which have several segments the area 730 may be divided into segments and then connected by several independent lines instead of a single 767 or 766 so that it can be appropriately cabled and driven. Segmenting of displays and addressing various segments is known in the art. The pixels could be designed so that the activating layers are put down in a passive matrix form or in an active matrix form. It is preferred that the encapsulation layer also cover the connection area. In addition, that the encapsulant be optically diffusive and/or have an L* value in the color coordinate of less than 60 so that the reflectivity from the display area is minimized. Examples of hole transport layer are materials comprising of N,N'-Bis(4-(2,2-naphthalen-1-yl)-N,N'-bis (phenyl)benzidene (NPB), N,N-Diphenyl-N,N-di(m-tolyl) benzidene (TPD) and poly(N-vinyl carbazole). The thickness of this layer is about 50 nm. Examples of materials comprising electron transport layers are aluminum tris(hydroxyquinolate) ($Alq_3$); lithium salt of boron quinolate ($LiBq_4$). The thickness of this layer is about 10 to 50 nm. Examples of cathode are calcium, aluminum, indium, magnesium, magnesium/silver alloy (e.g. 10:1 atomic ratio). The thickness of the cathode is typically 30 to 200 nm. The dielectric layer is typically a non-conducting oxide such as silica, alumina. The thickness of this layer is about 50 to 200 nm. The dielectric or sealing layer may also be polymeric, e.g. parylene (Advanced Coatings, Rancho Cucamonga, Calif.), epoxy, polyester, etc. All of these layers may be deposited using physical vapor deposition (PVD) or other means. PVD is preferred as the other areas on the substrate may be masked while these displays are being formed. Dopants may be used in Alq3 layer to control the color of emission or increasing efficiency. For example undoped Alq3 emits in green. Doping with platinum porphorion results in a red emission. Generally doped Alq3 is inserted as a separate layer between Alq3 and the hole transport layer. Another class of organic LEDs are made by using polymeric materials where layers of hole injection and electron injection are layered on top of each other. These polymers may be spin coated or deposited from solutions using various printing techniques such as ink-jet printing. When polymers are used, typically the device is similar in its layer construction as the low molecular weight organic device described above. The hole transport layer is replaced by a hole injecting conductive polymer such as polyaniline and poly (ethylenedioxythiophene). The electron transport layer is replaced by an electron injecting polymer layer such as poly(phenylenevinylene) (PPV) which emits in green, Cyano-PPV, polyfluorene and polythiophene.

Figure 8:
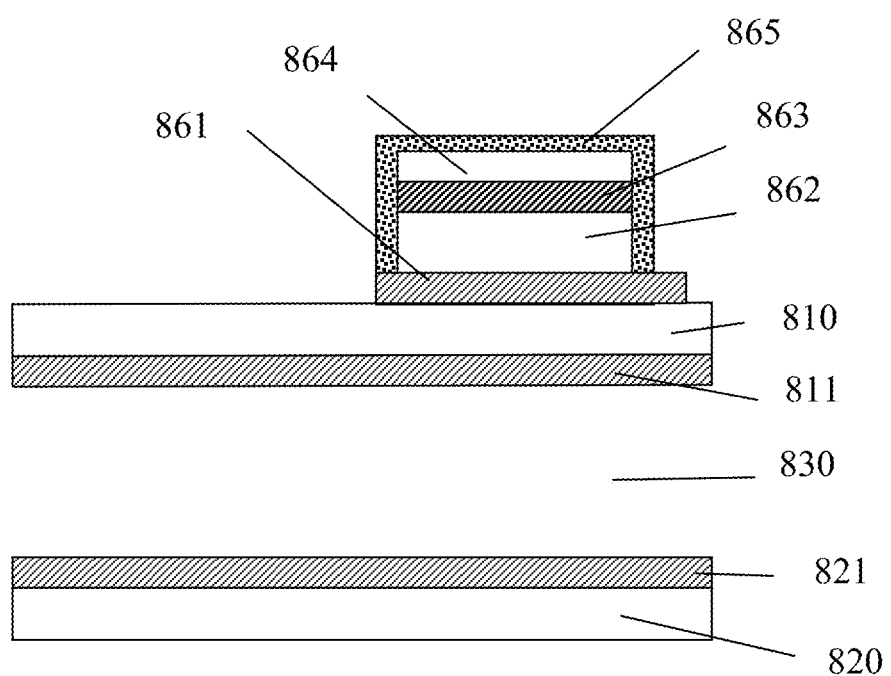
FIG. 8: Organic display integrated with an EC device.

FIG. 8 shows a device where the organic light emitting display is assembled outside the device on fourth surface. EC device is constructed on the principles of FIG. 1 with 810 and 820 being substrates coated with conductors on second and third surface as 821 and 811 respectively. For a third surface mirror 811 is also a reflector and a window is provided in this reflector (not shown) to position the display. The display comprises an ITO layer 861, sequentially followed by hole transport layer 862, electron transport layer 863, cathode 864 followed by a encapsulant 865. One may even form these LEDs on a separate substrate, such as thin polymeric substrate and place them inside the cell by bonding to the first substrate or outside the cell bonding them to the fourth substrate. When it is placed inside the cell, this placement should not interfere with the electrolyte thickness for the EC device.

The displays may also be located outside of the mirror active area. For example these may be attached or built into the mirror casing, stem, etc. As an alternative, the perimeter seal may portion a corner of the mirror so that this corner area is not part of the electrochromic cavity. This corner or notch is then used for a display, which may be between the two plates forming the EC cavity or outside. As described above, the display may also be formed or affixed in this area. One has to be careful in providing too many displays and information to the driver via the mirror, as its primary purpose is to enhance safety by providing a clear image of the rear-view with minimum distractions.

Permanent Indicators

Permanent indicators or markings on the mirrors have been traditionally etched, e.g., "Objects are closer than they appear on the mirror" or "Heated" on convex mirrors. Since many of these were first surface chrome mirrors this etching was done by removing chrome. There are patents on how these are incorporated into EC mirrors. For example U.S. Pat. Nos. 5,682,267; 5,689,370 and 5,189,537. U.S. Pat. No. 5,189,537 describes that this may be formed by depositing a dielectric layer on one of the inwardly facing transparent conductors. This blocks out the EC activity in the local area, thus making the markings visible when the device colors. U.S. Pat. No. 5,682,267 describes that this may be done by etching one of the interior facing surfaces before depositing the transparent conductor. This causes the reflection change in the area of etch. U.S. Pat. No. 5,689,370 describes another method where a reflective conductor is deposited on one of the conductive surfaces facing the interior of the EC cavity. All these methods may be used for devices with ionic liquids.

In addition there may be other methods which could be used to impart similar functionality. One of these is to form this insignia on the first surface of the EC mirror. This is the surface outside the EC cavity exposed to the elements. The material to form this indicator should have a different reflectivity or color as compared to the mirror in its various states of reflectivity. As an example this may be formed from chrome which may be highly reflective, diffusely reflective or colored. To form these one may start out by using substrates which are coated with chrome on one side and with the ITO on the other. The shapes for the mirrors may be cut and the chrome etched, or one may etch the chrome prior to cutting the substrate or after forming the EC cavity. For bent glass coatings may optionally be done on finished shapes. One may also deposit chrome through a mask so that no etching is required. The deposition or $4^{th}$ surface reflectormay also be done by electroless methods even after the EC cavity is fabricated before or after filling. Other metals such as silicon, titanium, platinum, gold, nickel may also be used. One may also silk screen inks and pastes including frits for forming the indicators.

Figure 15:
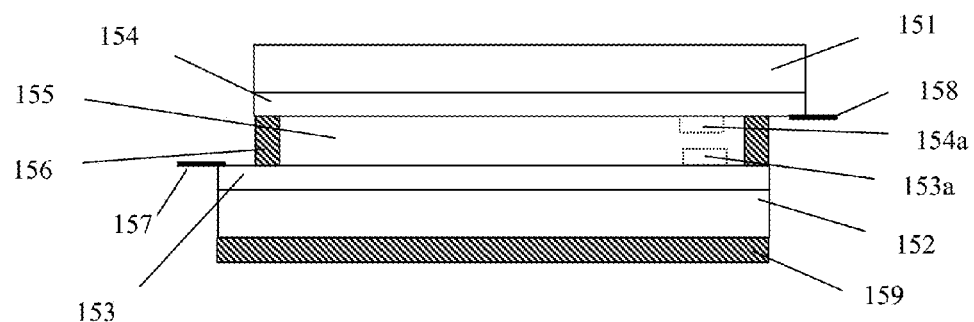
FIG. 15: Schematics of an EC mirror with permanent indicator.

Another way to form this indicator is by depositing the indicator material in the interior of the cavity on the second or third surfaces on top of the conductive layer similar to the process description in U.S. Pat. Nos. 5,689,370 and 5,189,537. However, unlike these patents, according to the principles of the present invention, the layer material should be conductive and light absorbing. In addition, this layer should not promote any undesirable reactions with the electrolyte. Light absorbing properties to resin pastes may be imparted by adding dark colored conductors such as carbon black or ruthenium oxide. However, as opposed to prior art one has to be careful that the base resin has a refractive index (RI) similar to one of either the layer it is deposited on or it is in contact with. For example if this layer is deposited on a transparent conductor of an EC cell formed by two substrates then the indicator material's RI should match within ±0.05 and preferably within ±0.01 with ITO under photopic conditions or at 550 nm. This matching with contacting conductor will avoid reflectivity from the interface. The difference in the light reflected from the mirror area compared to no light coming from this area will provide high contrast for viewing. The epoxy resins and fillers which may be incorporated in them other than the dark conductive colorants are the same as discussed earlier for the main seal. Various conductive carbon blacks may be purchased from Cabot Corp (Billerica, Mass.) and ruthenium oxide from ESPI (Ashland, Oreg.). These two materials may also be mixed in the resin. When the insignia is made using conductive materials one has to be careful that the two opposing electrodes are not shorted. Typically their thickness should be less than half the cell gap (distance between the two electrodes or electrolyte thickness) and preferably less then 20% of the cell gap and most preferably less than 10% of the cell gap. The content of the conductive material in the resin may range from about 2% to 25% to make the resin conductive. The processing of these, adhesion promotion, viscosity modification by adding fumed silica is the same as described earlier for main sealants. To match index with that of ITO one may have to use materials with high aromaticity and/or halogen content. One may also use non-organic resins for this purpose. For example, these may be solgel formulations based on silicon and titanium precursors which are mixed together to yield the right RI of the matrix. The RI for ITO depending on its composition and processing may vary between 1.6 to 2.0. The refractive index of silica-titania solgel coatings can be varied between 1.4 to 2.2 depending on the composition (see Chapter 14, in "Sol-gel Science" by C. J. Brinker, et. al., Academic Press, San Diego (1990)). If these absorbing materials are put on the third surface (front surface of the rear substrate) then refractive index matching should be with that of the contacting electrolyte. A schematics of this idea is shown in a single compartment EC mirror cell in FIG. 15. A fourth surface mirror device is shown made from substrates 151 and 152. which are coated with transparent conductors 154 and 153 respectively. The electrolyte 155 is enclosed by these substrates and a perimeter sealant 156. The fourth surface reflector is 159. This reflector may be a multilayer coating with the side closest to the substrate being silver, followed by copper or its alloy and then a paint. This is standard in mirror business where silver is protected from electrochemical corrosion and physical handling. The two electrical connectors are shown by 157 and 158. The permanent indicators are shown by 153a and 154a. Typically only one of these is used. If 154a is used then the refractive index of 154a should be matched with that of transparent conductor 154. If 153a is used then the refractive index of 153a is matched with the electrolyte 155.

Added Feature EC Mirrors

Several of the added functionalities to the commercial automotive mirror systems can be preserved when using EC mirrors based on ionic liquids. For example, light sources, optical detectors and displays may be integrated through transparent windows in the cell (e.g., see WO 00/23,826). The mirror housing may have lights so as to assist the driver at night to read instructions and maps or the exterior EC mirrors housing may have security lights (e.g., see 00738612/EP) and integrated turn signals. The mirror assembly may have buttons and knobs for various functionalities, such as to activate the mirror, change its dynamic range, activate lights or various displays, etc., information on a specific class of buttons can be found in U.S. Pat. No. 6,407,468.

Other additions to the mirror housings may be electronic garage door openers and vehicle network nodes (U.S. Pat. No. 6,396,408, US patent application 20020135465). Other features include microwave antennas for communication with external systems such as satellites or are linked with internal systems to display tire pressure, compass, temperature and other data (U.S. Pat. No. 6,407,712). Microphones and audio systems (U.S. Pat. No. 6,433,676) can also be attached. The audio systems may also be equipped with active noise control systems which cancel out the interior car noise by actively producing out of phase sounds and canceling the sound waves from other sources. These may also have image sensors such as CMOS imagers (See U.S. Pat. No. 6,483,438) which may be used for anti-theft, for mirror control by detecting and analyzing glare situations, headlight control and observing children and other occupants in the rear of the vehicle, etc. The variable reflectivity mirror housing may also be used for locating Wi-fi network node so that compatible devices in the car or the occupants with portable devices may access the internet. The interior mirror housings for EC mirrors are generally made of hard materials which are opaque and black in color. These housings or only the front bezels may be made with soft plastics or coated with soft plastics to make them safer. A desired hardness of the surface of the cases is below Durometer 90 (A scale). Further, the color of the cases may be coordinated with interior colors and may be opaque or transparent. Mirrors may also be constructed where both connectors are on the same substrate, one such scheme is disclosed in U.S. Pat. No. 5,818,625.

Powering and Use of EC Devices and Mirrors

The EC mirrors comprising ionic liquids can be driven in similar fashion as the conventional mirrors. For example, two light sensors can be positioned so that one is rearward facing and the other is forward facing. The differential, ratio or any desired function between the two can be taken as a level of glare. Examples of such drivers can be found in 00693397/EP and 00426503/EP A1 and U.S. Pat. No. 4,917,477. Since varying the voltage can control the reflectivity of these mirrors, the powering circuits may be adapted to color them in proportion to the glare. These can also be used for headlamp control. The voltages for coloration may be direct current which are constant with time or may be pulse width modulated to improve the response time (U.S. Pat. No. 6,084,700). The controllers for these mirrors could be separate, or integrated together. For example an image sensor described above may capture the complete image of the rear scene and then this could be analyzed to determine which of the mirrors (inside, outside right or outside left) needs darkening. Glare control in U.S. Pat. No. 6,386,713, and in US patent application 20020030892 may also be used in this invention. The EC devices with ionic liquids can be made using various busbar geometries and powered using methods described in U.S. Pat. No. 6,317,248. Such EC windows can also be incorporated in assemblies and controlled such as described in U.S. Pat. No. 6,039,390 and in WO 01/84230.

Photoresistors typically use cadmium and due to environmental concerns such resistors are an issue. Silicon based photodiodes when used are more expensive, these do get rid of the cadmium issue but do not deliver a significant jump in the performance as compared to the photoresistors. Typically the output from these is amplified using other electronic components and circuitry which results in high noise. In many cases the noise levels are so high that it is more meaningful to convert the signals to logarithmic scales and then compare the signals from the photosensors (e.g. see U.S. Pat. No. 5,204,778). To avoid these issues it is preferred to use integrated sensors where the sensing and the signal processing element are on the same silicon substrate. Such integration results in simplification and more miniaturization of the circuitry while also reducing power consumption and dissipation in mirror housings. As an example, integrated light sensors may be purchased from TAOS (Plano, Tex.). In preferred sensors, according to the present invention, the light intensity is outputted as frequency, i.e., the output signal frequency increases with light intensity in a linear fashion. These may be programmable (e.g., TSL230R, TSL230AR, TSL230BR, TSL230RD) or non programmable such as TSL235R. Programmable means that the output response curve could be chosen depending on the light input range. Further, these sensors have a high degree of stability against changing temperature (both dark current and change in output) for changing light conditions. This makes them easier to install in exterior and interior mirrors, so that temperature differences will still allow a meaningful comparison of the output of the various sensors. Such sensors may be used in any EC mirror control scheme which is known today, and will result in highly improved performance. Those temperature compensated sensors where the change in their output with temperature is less than 500 parts per million/° C. are preferred. The photosensors are located in close proximity of the EC mirrors such as mirror housings or quite close such as on the mirror mount. The glare sensors may also be located so that they sense the light directly or through a window in the EC device. In the latter case they are able to provide a feedback to the control system on the level of darkening. However, for the present invention either one of these locations may be used for glare sensor placement.

Figure 9:
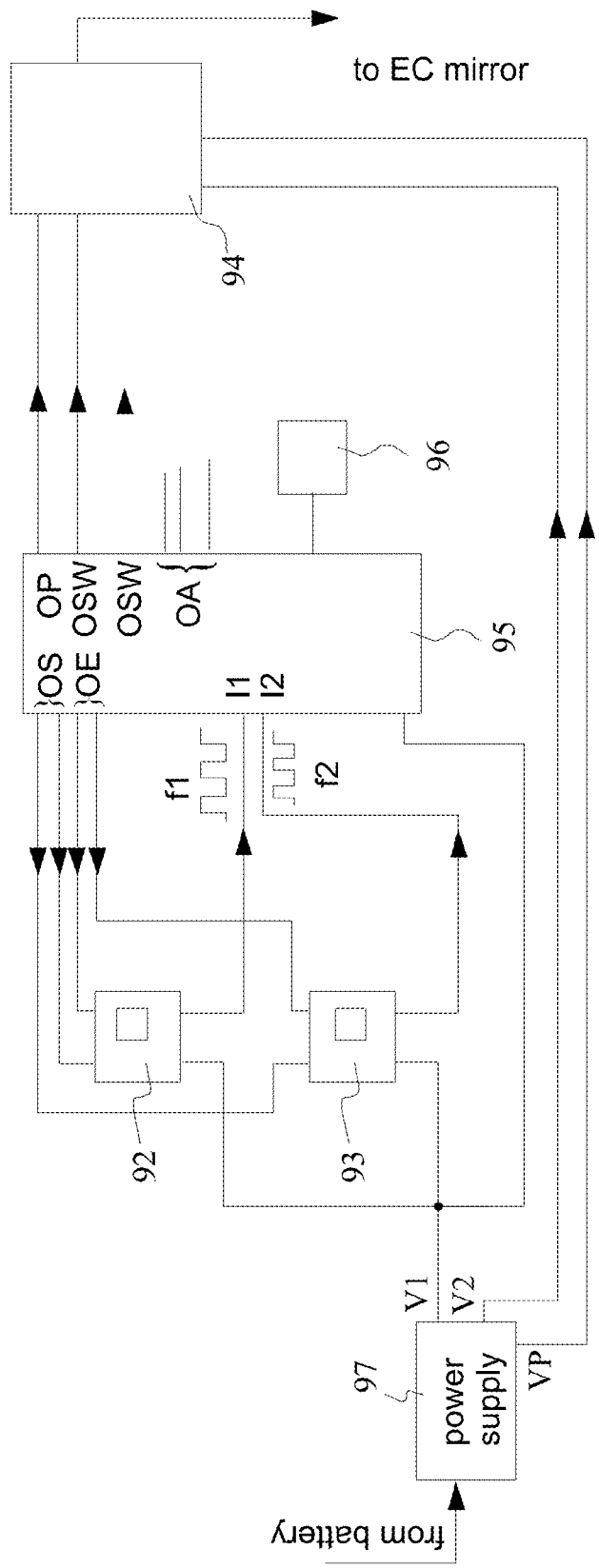
FIG. 9: A circuit diagram with an integrated sensor to control an EC mirror.

FIG. 9 shows a block diagram of a controller where two integrated sensors 92 and 93 are used in combination with a microcontroller 95 whose timing is driven by an oscillator 96. An example of a microcontroller is the PIC16F87x family from Microchip Technology Inc. (Chandler, Ariz.). The system is powered by the car battery (e.g., 12V, 42V, etc.) through block 97 where the potential is stepped down to regulated potentials V1, V2 (typically 5Vd.c.) to feed the rest of the electronics and a cell power line to feed block 94. VP is to provide power to the EC mirror and this may be a 9 or 12V line. The system may be reset when the ignition switch is turned on. Block 94 comprises of proper means of generating variable voltage for the EC cell. EC cells typically require voltages between ±2V. For the sensors, the low noise power supply is decoupled by a 0.01 to 0.1 microF capacitor (not shown). Two inputs of the microprocessor (I1 and I2) are used to measure the frequency generated by the light sensors (f1 and f2). Dedicated outputs (OS) are used to select the sensitivity and full-scale output frequency of each one of the sensors. This selection is used only if programmable sensors are used. By measuring the frequency and considering the state of those outputs, the microcontroller determines the absolute light intensity. Another output (OE) can control an enabling input in the sensors. Based on the intensity values, an algorithm determines the potential to be applied to the EC mirror. This information is sent to block 94 via a D/A (digital to analog converter) or a PWM (pulse width modulation signal) (OP). Block 94 produces the corresponding power signal for the cell. If necessary, the microcontroller can also output signals (OSW) to close or open switches (electronic or relay type) included in block 94 to apply the voltage to the cell or even short-circuit it to bleach. Other outputs (OA) and inputs (IA) (digital or analog) can control or read respectively other devices. Examples for output devices are headlamp-control, display-control and examples for input are temperature, compass, rain sensor, warnings, etc. For those cars utilizing 42V batteries, some of the voltages may be different, e.g. VP may be 42V or less.

Figure 10:
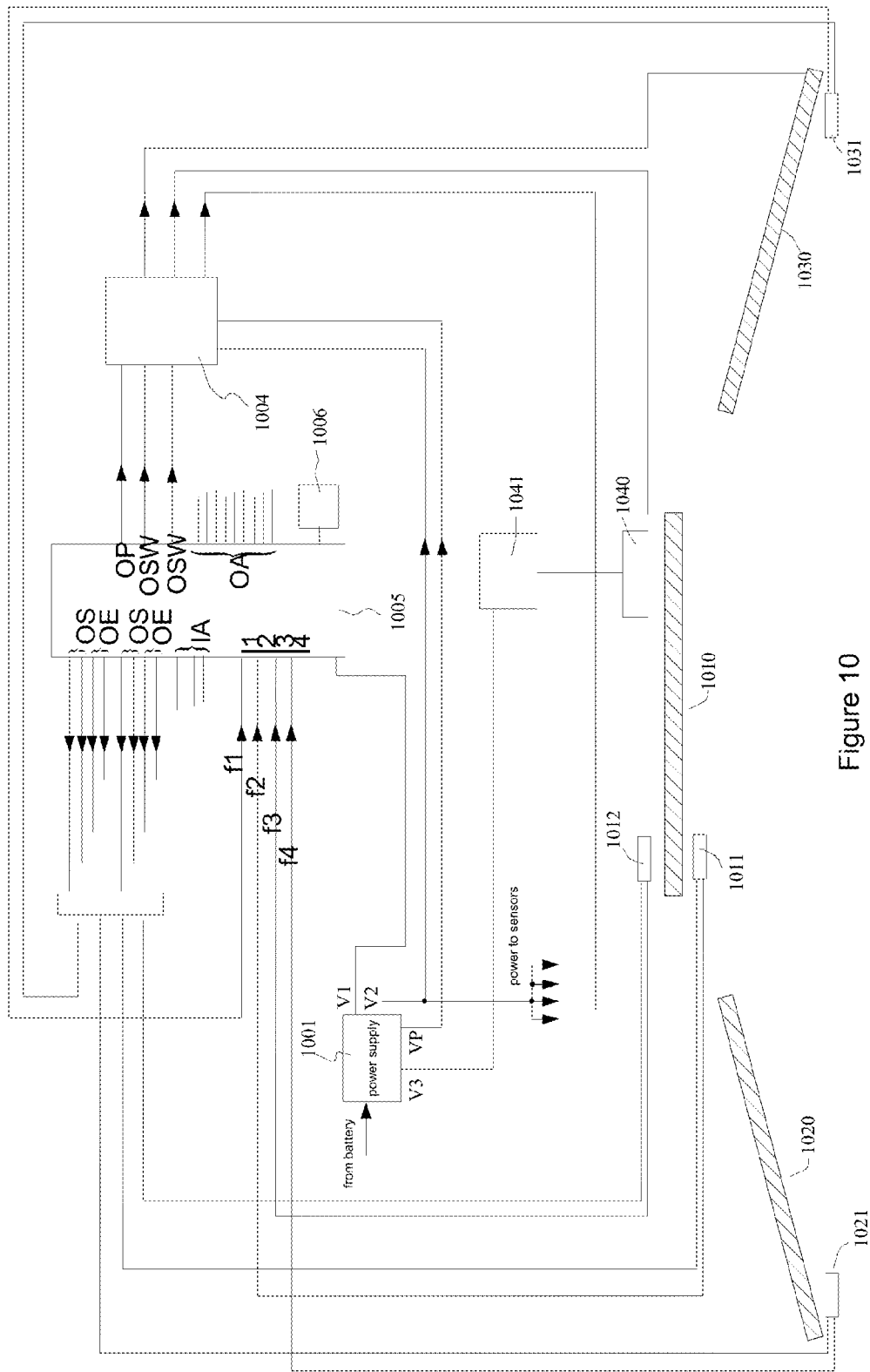
FIG. 10: A circuit diagram with an integrated sensor to control interior and exterior EC mirrors.

FIG. 10 shows another control diagram that shows the use of four integrated sensors for a system of EC mirrors in an automobile. This system has one interior mirror 1010 and two exterior mirrors 1020 and 1030 respectively. The interior mirror has a display 1040 for compass. Two of the integrated sensors are located in the interior rear-view mirror where one faces backward for glare measurement 1011 and the other forward or placed in any other convenient position so that it measures ambient light 1012. Each of the exterior mirrors also has an integrated sensors 1021 and 1031 facing backward to measure glare. Since these sensors have very little effect on their output with varying temperatures, the compensation needed for differences in temperature when comparing signals from any of the glare measuring sensors and the ambient sensor is not required. These sensors are temperature compensated over the light range of 320 to 1050 nm and from −25° C. to 70° C. or −25° C. to 85° C. Compensated sensors may also be used which compensate in a range of less than −25° C. to over 85° C. in range. However, since the interiors and surfaces of the cars (when in motion) are usually less than 70° C., and the outside mirrors are heated, the above ranges are sufficient. The temperature of the ambient sensor located in the interior of the vehicle may be quite different in temperature as compared to the one which is on the exterior of the vehicle. The other features are similar to those shown in FIG. 9. The power supply provides regulated voltages V1 and V2 to the microcontroller, power to Block 1004 which comprises of proper means of generating variable voltage for the EC cell and the sensors. The lines to the four sensors are not connected to keep the picture clear. 1005 is the microcontroller and 1006 is the oscillator similar to the one in FIG. 9 for 95 and 96 respectively. The other outputs and inputs marked in microcontroller 1005 are similar in functionality as explained in FIG. 9. The interior mirror may have reading lights (not shown) and the exterior EC mirrors may have other features such as turn signals and security lights. In one variation the exterior mirrors have no sensors, the interior mirror sensor controls the glare and darkens all mirrors simultaneously when a threshold of glare is reached. In another variation, the sensors in the exterior mirrors are not compared to the ambient sensor, rather if the glare sensors located in the individual exterior mirrors reach a certain threshold, the mirrors dim. Thus, these mirrors may also be activated during the day. However, if one wants to avoid the mirrors from coloring during the day, their coloration may further be tied to the logic generated by the internal ambient sensor which will keep these mirrors from activating unless the ambient light levels drop signaling dusk or nighttime. This signal may be generated from automatic headlight sensor or from the ambient sensor described above. One way to generate this signal is to define a threshold level for the ambient sensor and/or wait when the interior rear-view mirror is activated based on the differential interior glare and ambient sensor. One may even employ separate control system for each of the mirrors where each mirror has its own glare and ambient sensor. The communication between interior and exterior mirrors may be wireless, such as using blue tooth technology protocols or wired.

All electronics for mirror control may be integrated in a single chip (application specific integrated circuit or ASIC). This reduces the cost in high volumes. Optionally, at least one of the light sensors (preferably at least two of them which are located in the interior mirror) may also be incorporated within the same ASIC. These sensors may be reduced in size so that their projected area may be smaller than 3 mm diameter and preferably less than one mm in diameter, and most preferably less than 150 microns. This allows the sensors to be placed in the mirror area without being noticed by the car occupants. Ambient light (from one or more locations) or glare or all of these optical light signals may be brought to the sensor by coupling them with optical fibers. One may also use optical comparators to compare these signals, which may also be integrated within the same ASIC. These optical signals may also be used for other control mechanisms in the car, for example automatic headlight control. FIG. 17 shows a schematic of this concept. The figure shows an interior electrooptic mirror (e.g. an EC mirror, and may even be an outside mirror) 176 in a housing 171. ASIC chip is 172. A fiber optic cable 175 is used for collecting the forward facing ambient light signal via an attached lens 174. This fiber connects to the ASIC via another lens 177. Another fiber cable 179 collects a glare signal via the lens 178. The output of this is fed to the ASIC via lens 173. The powering and other inputs to ASIC are not shown. The fiber cables may be fiber bundles or single filaments. One may use multiple cables to collect the same signal for higher reliability in case the signal to one input gets blocked. The glare signal may also be collected through a transparent window in the electrooptic mirror. ASIC may also have compass and temperature functionality built in which is then displayed. The ASIC may also have light emitting LEDS or displays built into them, and this information may also be optionally routed via fibers or light guides to an appropriate place on the mirror. The ASIC may provide a number of other options which were discussed earlier without appreciably changing the cost of the mirror product.

According to the present invention, for mirrors, particularly for exterior mirrors that color during the daytime, a second or an additional control-system/mechanism may be employed. One may decide to color them if the ambient or the exterior sensors exceed a certain intensity threshold. The mirrors may be continuously colored during day as long as the ignition is on. During the daytime, it may not be necessary to color the mirrors to as low a reflectivity as during the night, e.g., a photopic reflectivity of 20 to 50% may be sufficient during the day, whereas at night a lower reflectivity may be required (e.g. less than 15% or preferably lower than 10%). Only one level may be chosen for daytime coloration, such as to mimic static blue mirrors. Since the coloring potential controls the coloration extent of the EC mirrors, a lower potential during the daytime may be chosen. Optionally more than one level may also be chosen, where the mirrors do not color until a given threshold of ambient intensity is exceeded, then color to a first level at a given threshold of ambient intensity and then color deeper to a second level when a second intensity threshold is exceeded as measured from the ambient sensor. For example, in electrochromic mirrors of the types shown in FIGS. 1-5, typically the maximum coloring voltage, or the maximum voltage of the range of voltages used during daytime coloration are lower than the maximum voltage used for nighttime coloration. For several examples discussed in this invention a voltage range of 0.6 to 0.9V may be used for coloring during the daytime which may be extended to 1.4V for nighttime use. The mirrors may lower reflectivity by coloring to any hue, but some of the preferred colors are gray, blue-green, blue, green, blue-gray and green-gray. Further, it is preferred to have outside mirrors color to a blue color, for this the reflector may be blue in color, or one of the substrates comprising the EC cell and in front of the reflector may be tinted. The glare problem from the Sun typically arises at sunset and sunrise when the Sun is at a shallow angle. Since due to atmospheric scattering the Sun acquires a more yellowish/reddish hue, the blue color is able to substantially reduce the glare without sacrificing the vision quality, as eyes are typically most sensitive in blue wavelength range. For daytime, only the outside mirrors may be activated. The nighttime operation of these mirrors may be typically done as explained above, i.e. based on the excess difference of glare (or first glare sensor) and ambient sensor (or the first ambient sensor). For daytime operation, glare control may be accomplished by continuous coloration as long as certain ambient light intensity is exceeded. There may be more than one level of ambient intensity threshold accompanied by variation in coloration depth. This intensity threshold controlling the daytime function may be a second control mechanism which is operated only by the ambient sensor. Alternatively there may be an additional ambient sensor which controls the daytime function and is located on the inside or outside of the car. The second ambient sensor may be triggered only during the day by the first ambient sensor. The second ambient sensor may be located outside the car and may be optionally mounted in the exterior mirror housing and may be optionally rear facing. This sensor may control the daytime function of all exterior variable reflectivity mirrors. The second control mechanism may be a manual override (e.g. by a rotary knob) where the auto driver may be allowed to dim the mirrors during the day to a comfortable level. This may even be tied to an auto-adjustment system which is used for mirror and seat positioning for different drivers. In the latter case, the driver may opt to color these mirrors by a switch during the day. This switch may then be deactivated at nighttime by the ambient light sensors so that the mirrors may return to automatic control. Some other features for manual control are described in U.S. Pat. No. 5,122,647 which may also be used in conjunction with the features described above. Further, the depth of coloration at night may also be configured to this automatic adjustment system for various drivers, so as to take into account their sensitivity to glare. There may be situations where one may want to return all mirrors to a particular state and override the automatic EC control mechanism, e.g., one of these instances may be when the automobile is put in reverse gear.

Figure 16:
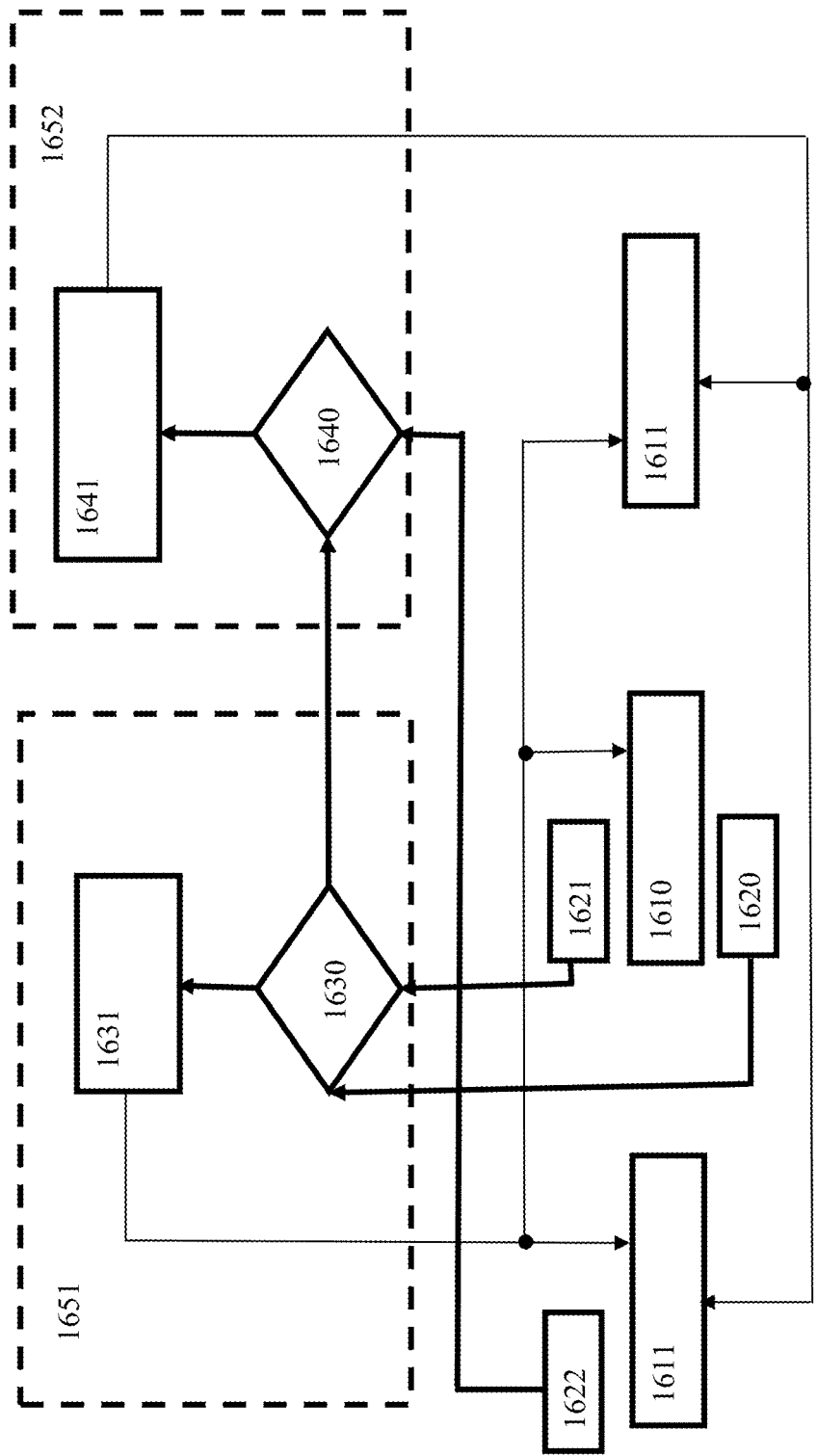
FIG. 16: A schematics for controlling day and night coloring variable reflective mirror system.

One embodiment (of the several possible) of the control mechanism where the daytime and the nighttime reflectivity are controlled is shown in FIG. 16. Three variable reflectivity mirrors (e.g. EC mirrors 1612, 1611 and 1610) are controlled. The first two of these are exterior mirrors (e.g., right hand side mirror and the left hand side mirror respectively) and 1610 is an interior mirror. Also shown are three sensors, 1620 is a rearward facing sensor for glare, 1621 is a forward facing sensor to measure ambient light intensity, and also sensor 1622 to measure ambient light intensity. Sensors 1620 and 1621 may be preferably located in the interior mirror housing. Sensor 1622 is preferably located in one of the exterior mirror housing. First control Mechanism is shown by box 1651 and a second control Mechanism by box 1652. Sensors 1620 and 1621 feed into a subcomponent 1630 of first Mechanism. If a glare is detected, then all mirrors are darkened. In this simple embodiment it is assumed that all mirrors are darkened when glare is detected by these sensors at night, although the exterior mirrors may have a different control system (not shown). The glare from these sensors is only detected at night because the intensity observed by sensor 1620 has to exceed that of sensor 1621. First mechanism is a standard mirror control system as described in numerous publications including those listed above. However, if no glare is detected a signal is sent to Mechanism 2 subcomponent 1640 to see if it is daytime and the ambient intensity is high. This subcomponent also gets a signal response from the ambient sensor 1622. If the intensity of this signal exceeds a predetermined threshold value (chosen for a particular daytime solar intensity), then the Mechanism 2 sends a signal to the exterior mirrors to darken. The second mechanism may have several threshold values programmed to dim the mirrors accordingly to different levels.

EXAMPLES

Example 1: Electrochromic Window Device Durability—UV Stabilizer A

Figure 11A:
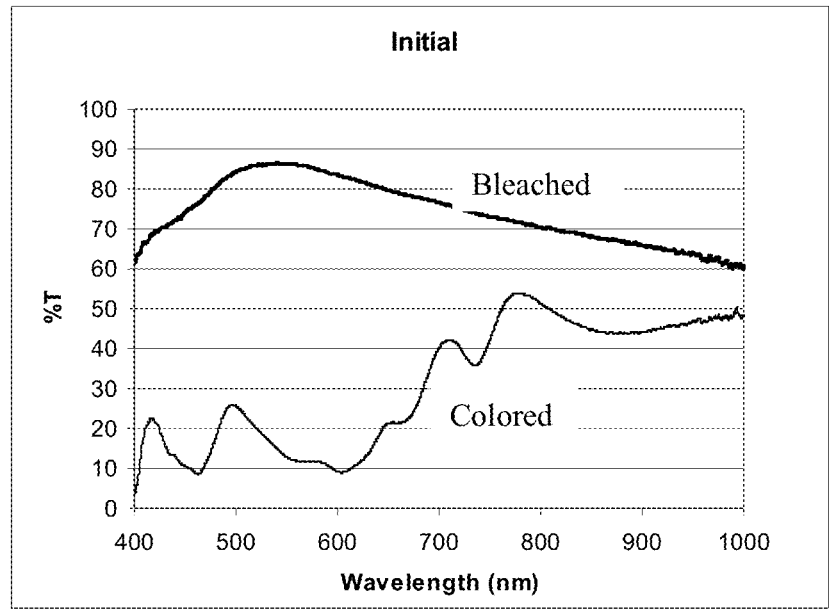
FIGS. 11a, 11b: Spectrum of an EC device in colored and bleached states before and after cycling.
Figure 11B:
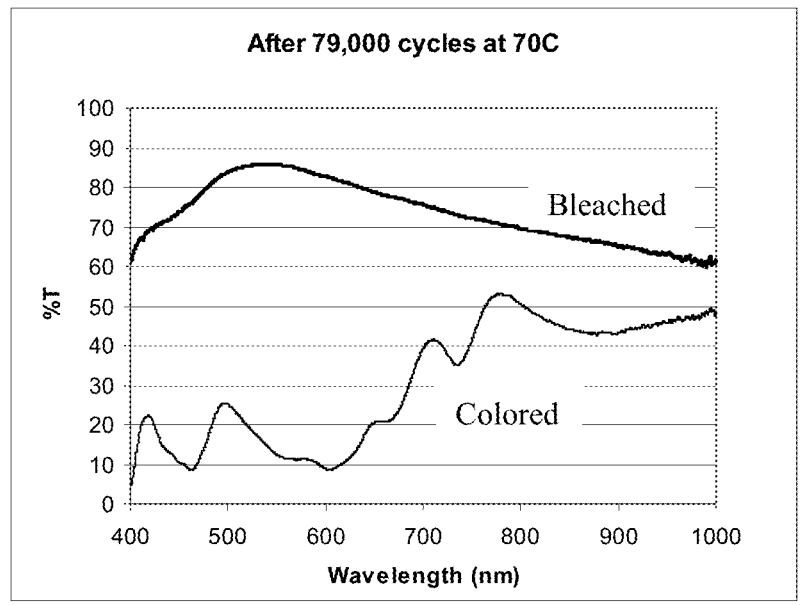

ITO substrates (15 Ω/sq) were cut into two 5.25"×3.67" rectangular pieces. The active area of the device was about 92 sq.cm. In one piece, two holes about 3 mm in diameter were drilled near the corners of one of the diagonals to fill the electrolyte. The substrates were then washed, dried and stored in clean room conditions. An epoxy containing 102.5 micron glass bead spacers was dispensed around the edges of one of the substrates and the second substrate was placed on top of it to make a cavity such that the two substrates were staggered by 5 mm along the long side of the rectangular edge. This exposed edge on both substrates was later used to apply a busbar and make electrical connections. The epoxy seal was cured at 150° C. The cavity was filled at room temperature with a liquid electrolyte containing 0.05M diethyl viologen bis(trifluoromethanesulfonyl)imide, 0.05M 5,10 dihydro-5-10-dimethyl phenazine and 2 wt % of 2-4-dihydrobenzophenone (UV stabilizer) in an ionic liquid. The ionic liquid was 1-butyl-3-methylpyrrolidinium bis(trifluoromethanesulfonyl)imide (BMP). After filling, the two holes were plugged with Teflon balls with a snug fit. The holes were further sealed using cover glass and an epoxy. A solder strip was applied to the exposed ITO on both of the two substrates along the long sides of the cavity using an ultrasonic solder. Electrical wires were then attached to these solder strips. The electrochromic performance of the window devices was determined by placing the cell in a spectrometer and following the color kinetics at 550 nm while a color potential of 0.8 volts was applied. The devices were bleached by shorting the two terminals. These devices colored very uniformly to a deep blue color and reversed to the original colorless state upon bleaching. Three sets such devices was made, where each set had three devices. One set was cycled between the colored (0.8 V) and bleached state (0.0 V) at 70° C. The results are shown in Table 1a. Another set was exposed to UV (Society of Automotive Engineers J1960 test conditions) and yet another set was stored at 85° C. and 85% relative humidity. The results are summarized in Tables 1b and 1c respectively. The tables also show the steady state current (I) in the colored state. FIGS. 11a and 11b show spectra of a device, both in the bleached and the colored states before the commencement of the cycling and after cycling at 70° C. for 79,500 times. The spectra were taken at room temperature.

TABLE 1a

| | I, (mA) | % T (550 nm) Bleached | % T (550 nm) Colored | Time to color | Time to bleach |
|---|---|---|---|---|---|
| | | | | Time (s) for 80% of full range | |
| Initial | 7.7 | 84.9 | 9.6 | 21.0 | 41.0 |
| After 79,500 cycles | 7.6 | 84.4 | 9.6 | 21.2 | 41.1 |

TABLE 1b

| | I, (mA) | % T (550 nm) Bleached | % T (550 nm) Colored | Time to color | Time to bleach |
|---|---|---|---|---|---|
| | | | | Time (s) for 80% of full range | |
| Initial | 7.9 | 86.1 | 9.4 | 22.2 | 41.7 |
| After 1,000 KJ of UV exposure | 7.9 | 84.0 | 9.0 | 21.2 | 47.8 |

TABLE 1c

| | I, (mA) | % T (550 nm) Bleached | % T (550 nm) Colored | Time to color | Time to bleach |
|---|---|---|---|---|---|
| | | | | Time (s) for 80% of full range | |
| Initial | 7.6 | 84.9 | 9.3 | 23.5 | 42.4 |
| After 720 hours@ 85° C. &85% RH | 8.4 | 84.5 | 9.1 | 22.9 | 41.5 |

Example 2: Electrochromic Window Device Durability—UV Stabilizer B

Another set of electrochromic cells was prepared as described in Example 1. In this case, the UV stabilizer was substituted with 5 wt % of 2-cyano-3,3 diphenyl-acrylic acid ethyl ester in the same ionic liquid as Example 1. The electrochromic performance of the window device was determined as described in Example 1. These devices colored uniformly to a deep blue color and reversed to the original colorless state upon bleaching. Three devices were subjected to each of the tests as described in example 1. The results are shown in Tables 2a, 2b and 2c. The devices did not show any discoloration after any of the tests or when kept at −40° C.

TABLE 2a

| | % T (550 nm) Bleached | % T (550 nm) Colored | Time to color | Time to bleach |
|---|---|---|---|---|
| | | | Time (s) for 80% of full range | |
| Initial | 86.3 | 11.9 | 22.4 | 50.8 |
| After 79,500 cycles | 85.9 | 12.1 | 22.6 | 50.1 |

TABLE 2b

| | % T (550 nm) Bleached | % T (550 nm) Colored | Time to color | Time to bleach |
|---|---|---|---|---|
| | | | Time to 80% of full range | |
| Initial | 87.1 | 11.1 | 22.9 | 53.9 |
| After 1,000 KJ of UV exposure | 81.6 | 10.2 | 22.9 | 57.5 |

TABLE 2c

| | % T (550 nm) Bleached | % T (550 nm) Colored | Time to color | Time to bleach |
|---|---|---|---|---|
| | | | Time (s) for 80% of full range | |
| Initial | 93.5 | 12.5 | 23.6 | 52.7 |
| After 720 hours@ 85° C. &85% RH | 85.4 | 11.2 | 21.6 | 46.9 |

Example 3: Electrochromic Window Device Durability—Mixed UV Stabilizers

Another set of Electrochromic windows was prepared as described in Example 1. In this case, the UV stabilizers were 2 wt % of 2-4-dihydrobenzophenone and 5 wt % of 2-cyano-3,3 diphenyl-acrylic acid ethyl ester in the same ionic liquid as Example 1. The electrochromic performance of the window device was determined as described in Example 1. This device colored uniformly to a deep blue color and reversed to the original colorless state upon bleaching. Three devices were subjected to tests as described in Example 1. The results are shown in Tables 3a, 3b and 3c.

TABLE 3a

| | % T (550 nm) | | Time (s) for 80% of full range | |
|---|---|---|---|---|
| | Bleached | Colored | Time to color | Time to bleach |
| Initial | 85.1 | 11.1 | 22.2 | 50.3 |
| After 79,500 cycles | 85.8 | 11.4 | 22.3 | 46.4 |

TABLE 3b

| | % T (550 nm) | | Time (s) for 80% of full range | |
|---|---|---|---|---|
| | Bleached | Colored | Time to color | Time to bleach |
| Initial | 85.8 | 10.8 | 22.3 | 49.2 |
| After 1,000 kJ of UV exposure | 78.0 | 9.5 | 23.5 | 56.0 |

TABLE 3c

| | % T (550 nm) | | Time (s) for 80% of full range | |
|---|---|---|---|---|
| | Bleached | Colored | Time to color | Time to bleach |
| Initial | 86.1 | 11.3 | 22.7 | 51.8 |
| After 720 hours@ 85° C. &85% RH | 85.4 | 11.0 | 21.7 | 48.8 |

Example 4: Device Performance at Various Temperatures

A window device was made in a shape of an interior automotive mirror using two pieces of ITO coated glass. As in Example 1, these substrates were sealed at the periphery using an epoxy. The spacing between the two ITO electrodes was 74 microns. The device was close to a trapezoidal shape with maximum length of 25 cms and width of 6.5 cms. The active area of the device was estimated at 120 square cms. A small gap was left in the seal for a port to introduce the electrolyte. This was backfilled at 100° C. using an electrolyte containing 0.04M diethyl viologen bis(trifluoromethanesulfonyl)imide, 0.05M 5,10 dihydro-5-10-dimethyl phenazine and 5 wt % of 2-cyano-3,3 diphenyl-acrylic acid ethyl ester in an ionic liquid. The ionic liquid was BMP. The fill hole was then sealed with a UV curing acrylate. The viscosity of this electrolyte at 25° C. was 103 cP and at 60° C. it was 23.3 cP as measured by a Rheometer HBDV-III+ CP (made by Brookfield, Middleboro, Mass.) using a cone and plate attachment. This device was colored by applying different coloring potentials. The bleached state transmission of the device at 550 nm was 84.3%. Its transmission at 550 nm and steady state current in the colored state is shown in the tables below.

TABLE 4a

Temperature: 25° C.

| | Coloring potential (V) | | | | | |
|---|---|---|---|---|---|---|
| | 0.7 | 0.8 | 0.9 | 1.0 | 1.1 | 1.2 |
| T % (550 nm) | 26.7 | 21.7 | 21.4 | 20.7 | 17.0 | 15.6 |
| Leakage Current (mA) | 7.6 | 9.5 | 9.5 | 9.5 | 11.7 | 14.0 |

TABLE 4b

Temperature: 50° C.

| | Coloring potential (V) | | | | | |
|---|---|---|---|---|---|---|
| | 0.7 | 0.8 | 0.9 | 1.0 | 1.1 | 1.2 |
| T % (550 nm) | 40.6 | 29.2 | 23.5 | 22.1 | 21.7 | 21.1 |
| Leakage Current (mA) | 16.3 | 22.0 | 25.3 | 27.6 | 29.6 | 33.3 |

Example 5: EC Device with a Solvent Comprising Ionic Liquid and a Non-Ionic Liquid A device was fabricated as in Example 4, but it was filled with a different electrolyte. The electrolyte solvent comprised of BMP ionic liquid to which 10% by weight of propylene carbonate was added. This mixed solvent was used as a base and 0.05M diethyl viologen bis(trifluoromethanesulfonyl)imide, 0.05M 5,10 dihydro-5-10-dimethyl phenazine and 5 wt % of 2-cyano-3,3 diphenyl-acrylic acid ethyl ester (UV stabilizer) was added. The viscosity of this electrolyte at 25° C. was 50.3 cP and at 60° C. 14 cP. This device was colored using different potentials both at 25° C. and at 50° C. The results are summarized in the Table below. The bleached state transmission of the device at 550 nm was 83.9%. All other details are same as in example 4.

TABLE 5a

Temperature: 25° C.

| | Coloring potential (V) | | | | | |
|---|---|---|---|---|---|---|
| | 0.7 | 0.8 | 0.9 | 1.0 | 1.1 | 1.2 |
| T % (550 nm) | 25.3 | 17.1 | 15.9 | 15.8 | 14.3 | 12.8 |
| Leakage Current (mA) | 20.0 | 25.5 | 26.4 | 26.9 | 28.7 | 31.5 |

TABLE 5b

Temperature: 50° C.

| | Coloring potential (V) | | | | | |
|---|---|---|---|---|---|---|
| | 0.7 | 0.8 | 0.9 | 1.0 | 1.1 | 1.2 |
| T % (550 nm) | 40.2 | 28.5 | 20.8 | 17.7 | 17.2 | 16.7 |
| Leakage Current (mA) | 38.4 | 54.0 | 66.0 | 70.3 | 71.5 | 74.7 |

Example 6: Inertness of Ionic Liquids Towards Plastics

Two common plastics were chosen, polymethylmethacrylate and flexible polyvinyl chloride (PVC). Three solvents were also chosen. The first solvent was an ionic liquid (BMP), second was propylene carbonate (PC) and the third was a mixture of BMP and PC in a proportion of 60:40 by volume. A drop of each liquid was put on each of the three plastics. The drop containing PC only solubilized and damaged the area leaving white stain where it was positioned on PMMA. The other two solvent compositions had no effect. In PVC, the PC drop was solubilized, and the other two solvent compositions maintained their shapes. The test duration was 72 hours. In another test a car dashboard was tested. The material for the dashboard is not known. Drops of the three solvents were put in three different areas. The droplet with only PC left a hole about 1 mm deep in the dashboard material after about 2 hours. The other solvents were wiped clean and no damage was seen as examined visually.

Example 7: Third Surface Reflector EC Mirror

A mirror was made using a third surface reflector. The size of the active area was 13.3 cm×13.3 cm. This size was chosen to roughly mimic the size of an exterior automotive mirror. The cavity thickness was 63 microns and the rear-electrode was a substrate coated with a silver layer which was further overcoated with ITO. The conductivity of the rear-electrode was 0.3 ohms/square. The front was 49 ohms/square ITO and slightly bigger than the bottom electrode to accommodate clip busbars. A clip busbar was applied almost all around the perimeter of ITO substrate, excepting the two diagonal corners where the ITO coated substrate was cut in order to make contacts with the rear electrode. The electrolyte was 70% ionic liquid (BMP) and 30% propylene carbonate (by volume) along with a bridged dye in a concentration of 0.05 molar. The dye was Fc-Vio imide. The mirror was colored by applying 1.2V, where the metallized electrode was held at negative polarity. The mirror was completely colored in approximately six seconds at room temperature. The steady state current in the colored state was approximately 50 mA.

Example 8: Epoxy Formulation with Long Pot Life

Several epoxy formulations were made to evaluate their Tg after curing. An epoxy formulation (formulation 1) was made using EPON™ 8281 and Ancamine™ 2441. The weight ratio was 100:20. This formulation had a pot life exceeding 4 weeks at room temperature. When this was cured in a differential scanning calorimeter and re-evaluated its Tg was 92° C. See Example 11 for details of Tg determination. Another formulation (formulation 2) was made where THPE-GE (a trifunctional epoxy) was added to EPON™ 8281, and cured with Ancamine™ 2441. The weight ratio of the three components was 20:100:24.5. This formulation had a pot life at room temperature in excess of 7 days, as the test for pot life was terminated after this period. The Tg of this formulation was 116° C. after it was cured in the DSC. When EPON™ 8281 was completely substituted by EPON 160 in formulation 2, with THPE-GE/EPON™ 160/Ancamine™ ratio of 20:100:26.2, the Tg under similar conditions was 127° C. and had good working viscosity in excess of 11 days.

Example 9: Epoxy Formulation with Long Pot Life

An epoxy perimeter seal formulation of an electrochromic cell was prepared from the following reagents:

TABLE 6

| Material | Quantity Used |
| --- | --- |
| Shell EPON Resin SU-3.0 | 10.0 g |
| THPE/GE | 2.04 g |
| HHMPA | 9.207 g |
| MY-H | 0.5 g |
| Fumed Silica | 1.0 g |
| Carbon Black | 0.12 g |
| Silicate filler | 25 g |
| Titania powder | 2.4 g |
| Glass spacers | 0.1 g |

The epoxy was prepared by mixing at 50° C. the EPON resin and THPE/GE until a complete mixture was formed. The anhydride HHMPA (Hexahydro-4-methylphthalic anhydride) was added and thoroughly mixed. The mixture was allowed to reach room temperature before the catalyst MY-H was added and thoroughly mixed. The fumed silica (product 38-126-8 from Aldrich Chemical Co, Milwaukee, Wis.) carbon black (Mogul L from Cabot Corp (Billerica, Mass.), epoxy silanized silicate (Novacite™ L207A from Malvern Industries (Hot Springs, Ark.)) titania (R960 from Dupont Chemicals, Wilmington, Del.) were then added under vigorous stirring. Once a homogeneous mixture was formed glass spacer beads (from Potter industries, Canby, Oreg.) were then added under stirring. The final mixture was a light gray color. A sample was smeared on a glass substrate and cured at 150° C. for one hour and its color coordinates measured using an Ultra Scan XE Colorimeter (Hunterlab, Reston, Va.) in the reflection mode. The L* a* and b* color coordinates were respectively 43.90, −0.53 and −1.31. The uncured epoxy was stored at room temperature under dry conditions and after more than 2 months showed no change in its viscosity, and the test was terminated after this period. The glass transition temperature (Tg) of the epoxy was determined using a Differential Scanning calorimeter (DSC) under nitrogen atmosphere at a heating rate of 10° C./minute between the temperature range 45° C. to 200° C. For a sample cured while heating in the DSC to 200° C. at 10° C./minute, the Tg was 131° C. and when cured in the oven at 150° C. for one hour the Tg appeared to be greater than 150° C. This formulation was also cured in a microwave oven (2.45 GHz, 600 W). After 5 minutes in the microwave oven (sample size about 2 g) it was found that the resin cured to about 27% as determined by the residual exotherm analysis when compared with uncured resin from DSC measurements.

Electrochromic interior mirror cells were prepared using this epoxy as the perimeter seal. The spacer size was 88 microns. Before dispensing the epoxy, the perimeter was primed using a primer prepared by 5 vol. % water+2 vol. % aminoethylaminopropyltrimethoxysilane (Z6020 from Dow Corning MI) in ethyl alcohol. This primer was then allowed to dry under ambient conditions. The epoxy was degassed prior to use. The cells were filled with an electrolyte by back filling under argon through a fill hole left in the perimeter epoxy seal. After filling, the fill hole was sealed with an UV curing acrylate. The durability of the sealing process was tested in an autoclave under conditions as described earlier. The autoclave was vented every day and the cells examined. After 9 days in the autoclave the cells were completely intact with no seal failure and colored upon powering. The autoclave test was terminated after this period. An epoxy silane glycidoxypropyltriethoxysilane (Z6040 from Dow Corning) was mixed with 0.1143 g of acidified water (pH 2, by adding hydrochloric acid) for hydrolysis. Hydrolysis was done at 60° C. for 3 hours under continuous stirring. For each 100 g of the above epoxy formulation, 1.2 g of this mixture was added and then this was used to prepare an EC cell without the priming step as described above. After 7 days in autoclave the cells were intact. Good adhesion was also obtained when non-hydrolyzed epoxy silane was added to the epoxy in the same proportion as discussed above and passed the seven day autoclave test. After 14 days in autoclave, the cell with pre-hydrolyzed silane was still intact and the test was discontinued. These epoxies with non-hydrolyzed and pre-hydrolyzed silane had shelf life of more than 3 months, and they also maintained their adhesive characteristics in this period.

Example 10: Epoxy Formulation with Long Pot Life

An epoxy sealant for electrochromic cells was prepared (see material details in Example 9) in the concentrations shown in the table below.

TABLE 7

| EPON SU 3.0 | THPE/GE | HHMPA | MY H | Fumed silica | Carbon Black | Silicate | titania | Glass spacers |
|---|---|---|---|---|---|---|---|---|
| 10.068 g | 1.994 g | 8.99 g | 0.5014 g | 3.0 g | 0.12 g | 10 g | 2.404 g | 0.1 g |

The ingredients were mixed as described in Example 9. The epoxy formulation was a light gray color and when stored at room temperature in dry conditions showed no change in viscosity after 24 days. DSC analysis of the epoxy showed a Tg of 122° C. (sample cured during DSC analysis) and 144° C. for the epoxy cured in the oven at 150° C. for 1 hour. Two electrochromic mirror cells were prepared as described in Example 9 using this epoxy as the perimeter seal. The epoxy was degassed prior to use. The cells was filled with an electrolyte by back filling under argon with the fill hole sealed with an UV curing acrylate. The durability of the sealing process was tested in an autoclave. After 7 days in the autoclave the cells were complete intact with no seal failure and the test was terminated.

Example 11: Epoxy with Nano-Sized Clays

An epoxy seal for an electrochromic device was prepared using a surface modified nano-sized clay (Nanomer 1.28E from Nanocor Inc.) as a filler. The epoxy was prepared using the following materials:

TABLE 8

| EPON SU 3.0 | THPE/GE | HHMPA | MY H | Nano-sized clay |
|---|---|---|---|---|
| 10.091 g | 2.08 g | 9.04 g | 0.5 g | 3.07 g |

Figure 12:
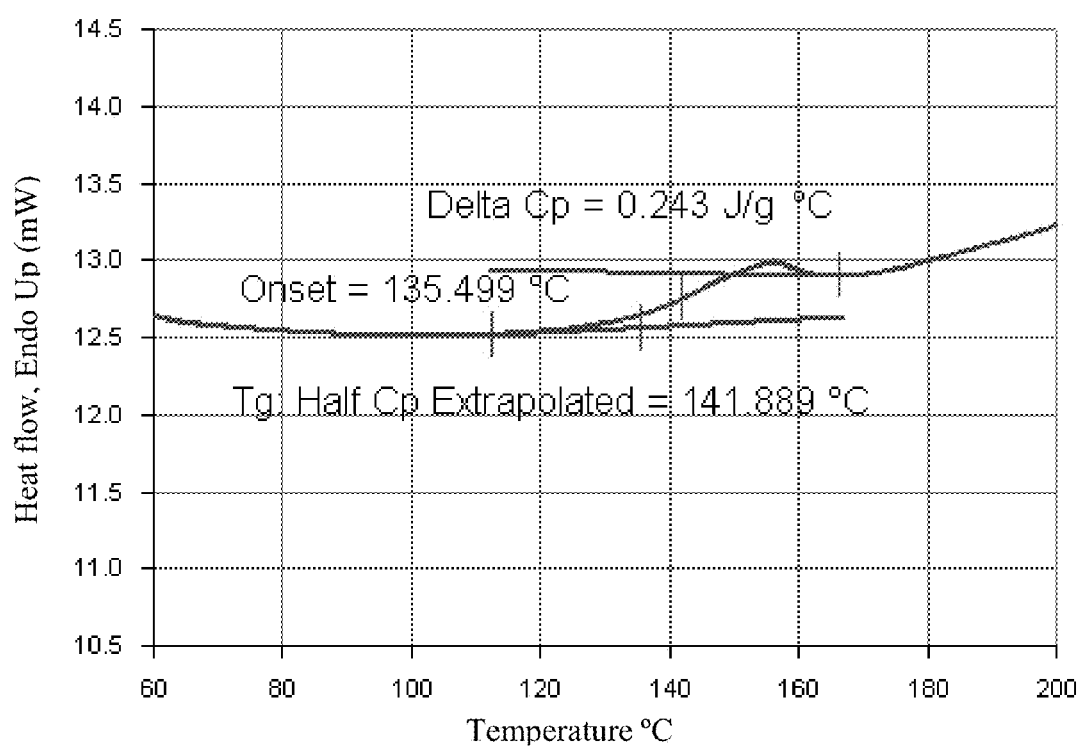
FIG. 12: A differential scanning calorimeter trace showing the glass transition temperature (Tg) of an adhesive.

The materials were mixed thoroughly to give a thick viscous paste. The glass transition temperature (Tg) of the epoxy was determined using a Differential Scanning calorimeter (DSC) under nitrogen atmosphere at a heating rate of 10° C./minute between the temperature range 45° C. to 200° C. For a sample cured while heating in the DSC the Tg was 151° C. and when cured in the oven at 150° C. for one hour the Tg was 142° C. Alumina spacers manufactured by RSA Le Rubis Magasin Poudres (France) where added (0.027 g) to 2.458 g of the epoxy to form a sealant for a cell application. FIG. 12 shows a DSC trace for the oven cured sample. The graph shows the change in heat flow vs. temperature. The glass transition (Tg) area is that part of the curve where a step change is seen in the curve. The onset of Tg is calculated by extrapolating the DSC curve from before the transition and then drawing a tanget from the step region where the curve is rising and shows the maximum slope. ΔCp is the change in specific heat at the transition or the height of the step, and the Tg is being referred to that temperature where the change in Cp is half of ΔCp in this stepped region.

Example 12: Epoxy with Nano-Sized Clays

An epoxy sealant was prepared as described in example 5 except an Epoxy Novolac resin from Dow Chemical (D.E.N 438) was used instead of mixed EPON SU3.0 and THPE/GE as described in Example 11. The epoxy was prepared using the following materials:

TABLE 9

| D.E.N 438 | HHMPA | MY H | Nanocor |
|---|---|---|---|
| 9.98 g | 7.014 g | 0.5 g | 3.05 g |

The materials were mixed thoroughly to give a thick viscous paste. DSC analysis was performed as described in Example 9 and for the DSC cured material the Tg was 147° C. with an onset at 143° C. The material cured in an oven at 150° C. for one hour had a Tg of 146° C.

Another perimeter main seal epoxy was prepared with an inorganic content of 28.5 wt % as follows. An inorganic of nanometer size powder Nanomer I.28E from Nanocor Inc. IL was dried by heating in a vacuum oven at 100° C. for 16 hours. Immediately after drying 20 g of this material was added to 200 g of EPON 8281 and rapidly stirred at 120° C. for 24 hours. This formed a base resin 174-B. This base resin was formulated into a sealing material according to Table 10. Ingredients such as titania and silicate are described in Example 9.

TABLE 10

| | Material | | | | | |
|---|---|---|---|---|---|---|
| | 174-B | PN 23 | Titania | silicate | Carbon Black | Glass Spacers |
| Weight grams | 10.001 | 2.273 | 1.1315 | 2.273 | 0.005 | 0.09 |

A sample of the epoxy was cured in an oven for one hour at 150° C. The oven temperature was ramped from room temperature to 150° C. at 10° C./minute. This was analyzed for Tg using a Differential Scanning calorimeter under nitrogen atmosphere at a heating rate of 10° C./minute between 50° C. and 200° C. The epoxy had a Tg of 142.4° C. with an onset temperature of 136.1° C. In the uncured state the epoxy was left standing 18 days under ambient laboratory conditions and showed no change in physical appearance and was as dispensable as when freshly prepared.

Another epoxy formulation was prepared with the following composition:

TABLE 11

| | | | Material | | | |
|---|---|---|---|---|---|---|
| | 174-B | THPE/GE | PN 23 | Titania | silicate | Carbon Black | Glass Spacers |
| Weight grams | 10.08 | 1.82 | 2.782 | 1.1315 | 2.272 | 0.005 | 0.09 |

Resin 174-B and THPE/GE was premixed at 50° C., cooled and then the other additives were added as described above. When this formulation was cured in an oven at 150° C. as given above its Tg was 148° C. with an onset of 142° C. In the uncured state the epoxy was left standing 18 days under ambient laboratory conditions and showed no change in physical appearance and was as dispensable as when freshly prepared.

Another formulation was made with the composition given below:

TABLE 12

| | | | Material | | | |
|---|---|---|---|---|---|---|
| | EPON 8281 | PN 40 | Nano sized clay | silicate | Carbon Black | Titania | Spacers |
| Weight grams | 10.04 | 2.5 | 0.505 | 5.02 | 0.12 | 2.505 | 0.1 |

EPON 8281 and nano sized clay was first mixed together before adding the other ingredients. The Tg of this material when cured in an oven at 150° C. was 134° C. and the onset was 126° C. The pot life of this material was in excess of 30 days.

Example 13: Characteristics of Solid Electrolyte

Figure 13:
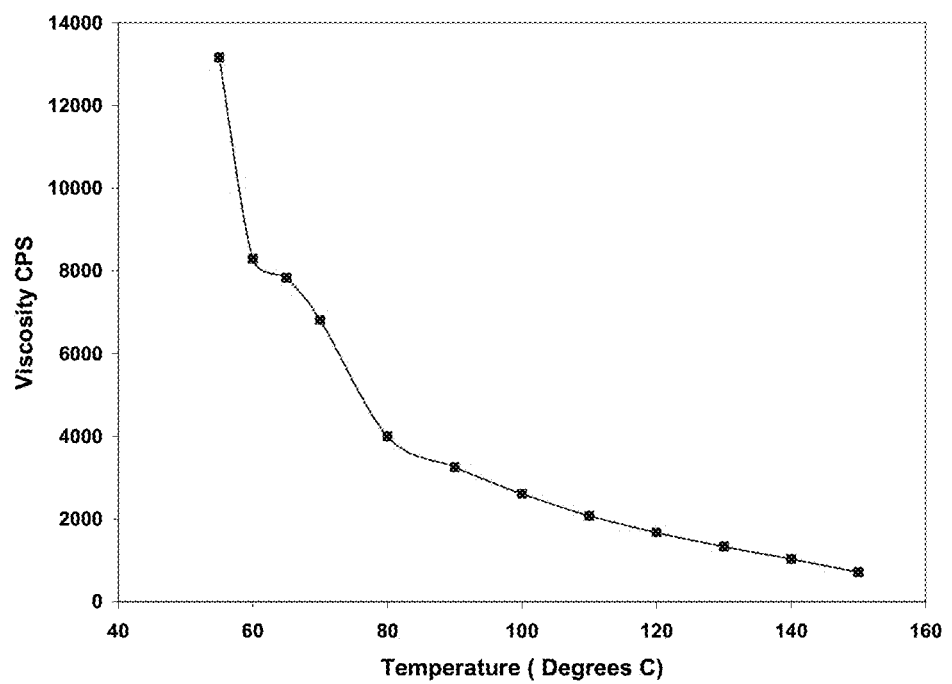
FIG. 13: A viscosity temperature curve of an electrolyte.

A liquid electrochromic electrolyte was prepared from a 70:30 wt:wt % 1-butyl-3-methyl-pyrrolidinium bis(trifluoromethylsulfonyl)imide and propylene carbonate with 0.065M Fc-Vio imide. Fc-Vio imide is a dye which has an anodic moiety (ferrocene) which is covalently linked to a cathodic moiety (viologen cation) and the anion is imide. This liquid was solidified by adding 7.2 wt % (based on liquid electrolyte weight) of Solef 21216/1001 copolymer. The mixture was heated to 100° C. to enhance solubility and when it was cooled to room temperature a solid material was obtained. Through the use of a Differential Scanning calorimeter under nitrogen atmosphere at a heating rate of 10° C./minute the melting onset was 64° C. with a peak temperature at 74° C. The viscosity of the electrolyte was measured using a Brookfield Digital Rheometer with a cone and plate attachment. The trend in viscosity (FIG. 13) was similar where it increased rapidly below 70° C. and could not be measured at 50° C.

Example 14: Solid Electrolyte in Cell

Two pieces of 40 Ω/sq. ITO coated on glass were cut into 2"×2.5" sections. One piece was drilled with two fill holes at opposite corners (of the diagonal). Cells were made by applying an epoxy containing 63 micron spacers to the perimeter of one of the ITO substrates. The second substrate was then placed on top of the epoxy coated ITO glass, in a position which was staggered by 0.05 inches. Clamps were applied to the assembly at the epoxy perimeter to ensure intimate contact as well as to ensure the cell spacing conformed to the spacer size in the epoxy. The cells were fired in an oven at 150° C. for one hour to cure the epoxy. They were then filled with electrolyte under a dry inert atmosphere by injecting the medium through one of the fill holes. Both the holes were subsequently sealed using a Teflon ball and followed by room temperature UV curing acrylic. A solid electrolyte was prepared as described in Example 13. The electrolyte and cell were heated to 100° C. to enable free flow of the electrolyte into the cell cavity. Conductive metal clips with soldered leads were placed on the conductive surfaces which protruded from either side of the cell (along the sides which was separated by about 2.55 inches). These formed the electrical contacts to each electrode. The transmission of the cell at 550 nm was 82% and under an applied potential of 1.3 volts the cell colored to 8.5%. The time to color 80% of this range took 16 seconds and when the leads were shorted took 15 seconds to bleach back 80% of range. The color coordinates and % haze was measured using an Ultra Scan XE Colorimeter in the total transmission mode. The X, Y and Z coordinates of the cell were respectively 73.94, 78.90 and 70.94 and haze was 0.14%. The cell did not show any change after cycling 80,000 times at 50° C.

Example 15: Solid Electrolyte in Cells of Different Gap. Comparison with Liquid System A solid and a liquid electrolyte were prepared as described in Example 13 except that the concentration of Fc-Vio imide was 0.03M. For the liquid electrolyte the copolymer Solef 21216/1001 was not included in the formulation. The solid electrolyte was used to fill cells as described in example 14 with cell gaps of 88 and 63 μm and the liquid electrolyte a cell with an 88 μm gap. The electrochromic properties at 25° C. of the cells are shown in the following table. Leakage current is steady state current in the solid state. The cells self bleached when the power was removed.

TABLE 13

| Electrolyte Type | Cell Gap | % T (550 nm) Bleached | % T (550 nm) Colored at 1.3 V | Time (sec.) to Color 80% of Range 1.3 V | Time (sec.) to Bleach 80% of Range Short | Leakage Current mA/cm² at 1.3 V (25° C.) |
|---|---|---|---|---|---|---|
| Solid | 88 μm | 76 | 8 | 15 | 22 | 0.172 |
| Liquid | 88 μm | 80 | 3 | 14 | 25 | 0.230 |
| Solid | 63 μm | 78 | 18 | 18 | 13 | 0.234 |

Example 16: Solid Electrolyte Performance as a Function Temperature

A solid electrolyte was prepared as described in Example 13. This was used to fill a cell prepared as described in Example 14, with a cell gap of 63 μm. The electrochromic properties of the cell were measured between 25° C. and −20° C. and are shown in the following table. The cells were colored at 1.3V and bleached by shorting the two electrodes. When power was removed after coloring the cells, the cells self bleached at all temperatures.

TABLE 14

| Temp. ° C. | % T (550 nm) Bleached | % T (550 nm) Colored at 1.3 V | Time (sec.) to Color 80% of Range | Time (sec.) to Bleach 80% of Range |
|---|---|---|---|---|
| 25 | 78.0 | 3.9 | 14.4 | 18.4 |
| 0 | 78.2 | 3.6 | 14.3 | 53.3 |
| −10 | 77.5 | 3.7 | 19.9 | 95.4 |
| −20 | 78.3 | 4.2 | 38.0 | 194.4 |

Example 17: Comparison of Solid and Liquid Electrolyte with Anodic and Cathodic Dyes A solid electrolyte was prepared as described in Example 14 except that the anodic and cathodic electrochromic dyes were diethylviologen bis(trifluoromethylsulfonyl) imide and dimethyl phenazine both at concentrations of 0.03M. A 63 μm cell was prepared as described in example 1 and filled with the electrolyte. At 550 nm the transmission of the cell was 83% and when colored at 1.3V the transmission was 34%. To color and bleach 80% of range it took 6 seconds for both, when colored at 1.3V and was shorted for bleaching. The cell had a haze value of 0.09%. A similar cell was prepared with a liquid electrolyte without the polymer. The cell had a transmission of 85% and when colored (at 1.3V) 35%. To color (at 1.3V) 80% of this range took 7 seconds and 5 second to bleach. The cell had a haze value of 0.09%.

Another solid electrolyte was prepared with the same two dyes in 0.03 molar concentration (each) in propylene carbonate by mixing two polymers. A mixture of 12 wt % Solef 21216/1001 and 2 wt % Solef 11008/1001 was added to solidify the electrolyte.

Example 18: EC Cell with Solid Electrolyte

A solid electrolyte was prepared by dissolving 0.065M Fc-Vio imide and 9.6 wt % Solef 11008/1001 in 70:30 v:v % 1-butyl-3-methyl-pyrrolidinium bis(trifluoromethylsulfonyl)imide and propylene carbonate. This electrolyte was used to fill a 63 μm cell as described in Example 13. At 550 nm the transmission of the cell was 76% and when colored at 1.3V the transmission was 10%. The time to color 80% of this range took 25 seconds and when the leads were shorted took 14 seconds to bleach back 80% of range. The cell had a haze value of 0.27%.

Example 19: EC Cell with Solid Electrolyte

An electrochromic cell was prepared as described in Example 14 except that the ITO electrodes used had a sheet resistance of 13 Ω/sq and the cavity spacing was 88 μm. The cell cavity was filled with an electrolyte of composition described in Example 13. At 550 nm the cell had a transmission of 77.6% and when colored at 1.3 volts a transmission of 4.5%. The time to color (at 1.3V) 80% of this range took 13 seconds and when the leads were shorted took 19.6 seconds to bleach back 80% of range. At 25° C. under a color potential of 1.3 volts the cell had a leakage current of 0.258 mA/cm².

Example 20: Third Surface Interior Mirror

A third surface mirror interior automotive mirror was prepared which was a trapezoidal shape with the distance between the parallel sides of about 5 cm and the average length of the parallel sides about 25 cm. The reflective electrode was silver overcoated with ITO on glass. The conductivity of this reflective electrode was 0.3 ohms/square. The front, transparent electrode was ITO coated on glass with a conductivity of 45 ohms/square. The electrolyte thickness was 63 microns and the composition was as described in Example 7. The scheme of busbars for this mirror was similar to the one described in FIG. 14, where the front electrode had clip busbars both on top and bottom running through most of the length of the parallel sides. The back reflector was connected at two points on the side with clips of lengths about 1.5 cm each. This mirror colored from 86.7% reflectivity to 8.7% reflectivity at 550 nm at a voltage of 1.2V. The coloring time to cover 80% of this range (measured from highest reflectivity) was 3.4 seconds. The bleaching time to cover this range from lowest reflectivity was 10.5 seconds.

Example 21: Third Surface Mirror with Solid Electrolyte

A solid electrochromic electrolyte was prepared from a 70:30 v:v % 1-butyl-3-methyl-pyrrolidinium bis(trifluoromethylsulfonyl)imide and propylene carbonate with 0.065M Fc-Vio imide and 7.2 wt % of a linear copolymer Solef 21216/1001). This electrolyte was used to fill a mirror cell prepared as described in example 14, with a cell gap of 63 μm. The rear electrode was a silver/ITO combination as described in Example 20 and the front was 45 ohms ITO. The electrolyte and cell were heated to 100° C. to enable free flow of the electrolyte into the cell cavity. The reflection of the cell at 550 nm was 83% and under an applied potential of 1.1 volts the reflection dropped to 8.0%. The time to change reflectivity 80% of this range took 8.2 seconds and when the leads were shorted took 13 seconds to bleach back 80% of range.

Example 22: EC Cell with a Charge Transfer Dye

A charge transfer dye (Ph-Vio) was synthesized with a structure as shown below:

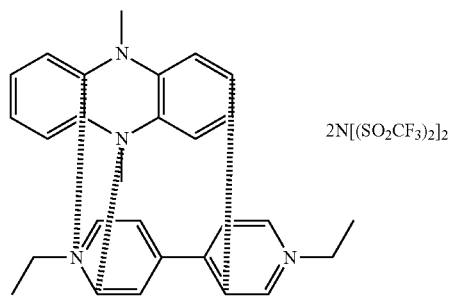

(a) An electrolyte was prepared by mixing under nitrogen 70/30 vol:vol 1-butyl-3-methyl-pyrrolidinium bis(trifluoromethylsulfonyl)imide and propylene carbonate. To this mixture was added 0.05 molar Ph-Vio. The mixture was stirred to give a clear green solution. A transparent cell with ITO of sheet resistance 13 Ω/sq and a cell gap of 88 μm (prepared as previously described in Example 14) was filled with this electrolyte. The cell was clear in the bleached state. The electrochromic characteristics of the cell were determined at 550 nm using a Shimadzu UV/VIS/NIR spectrometer. The transmission of the cell as a function of color potential is shown in the table below.

TABLE 15

| Color Potential (Volts) | % Transmission (550 nm) |
|---|---|
| 0.0 | 84.5 |
| 0.5 | 66.3 |
| 0.6 | 38.0 |
| 0.7 | 17.6 |
| 0.8 | 7.8 |
| 1.0 | 6.0 |
| 1.1 | 5.0 |

Under a color potential of 1.1V the cell colored to 80% of its range in 4.7 seconds and was then bleached after full coloration by shorting the two terminals. Bleaching time for 80% of the range was 13 seconds.

(b) An electrolyte was prepared from a 70:30 v:v % 1-butyl-3-methyl-pyrrolidinium bis(trifluoromethylsulfonyl)imide and propylene carbonate with a mixture of 0.025M charge transfer complex dye (Ph-Vio) and 0.025M Fc-Vio imide dye. Both dyes had both cathodic and anodic moieties. The mixture was heated to 60° C. to enhance solubility and when cooled to room temperature was a clear liquid. This electrolyte was used to fill an 88 µm cell with ITO of sheet resistance 46 Ω/sq (Cell construction and size was similar as described in Example 14). At 550 nm the cell had a transmission of 83% and when colored at 1.1 volts a low end transmission of 27%. It took 7.7 seconds to color 80% of this range and when shorted it took 8.6 seconds to bleach 80% of range Another sample was made (as described in Example 14) using the same ingredients as above (as in "a"), where the electrolyte was solidified by adding 6 weight percent of Solef 21216/1001 polymer and the charge transfer dye concentration was 0.06M. The sample comprised of a third surface mirror with silver over-coated with ITO glass as one electrode deposited on glass, and the other electrode being 45 ohms ITO on glass, with the conductive sides facing inwards and the spacing of 63 microns between them. The cell was powered by applying one busbar to one protruding edge and one busbar to the other protruding edge. The separation between then was about 2.5 inches. The cell colored from 83.6% reflectivity to 8.3% when 1.1V was applied. 80% of this range was covered in 4.5 seconds. When the two busbars were electrically shorted, the sample bleached 80% of this range in 3.9 seconds. Two additional samples were made where the reflective electrode was replaced by ITO coated glass. One of these had an electrode separation of 63 microns and the other 88 microns (electrolyte thickness). When haze was measured on these cells, a value of 0.06% was obtained for both of them which is almost indistinguishable from the liquid cells. Visible haze was measured using Ultrascan instrument from Hunterlabs (Reston, Va.).

The foregoing description of the invention has been presented for purposes of illustration and description and is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

The invention claimed is:

1. An electrochromic assembly, comprising a rear element and a transparent front element bonded together by an opaque sealant in a spaced apart relationship to define a chamber, and an electrochromic material contained in the said chamber, the said sealant comprising an epoxy resin formulation and a curing agent selected so as to have latent curing property and, (a) glass transition temperature in cured state in excess of 120° C. and (b) an inorganic content of greater than 35% by weight.

2. An electrochromic assembly as in claim 1, where the said sealant comprises crystalline nano-particles of inorganic materials.

3. An electrochromic assembly as in claim 1, where the said sealant comprises UV stabilizers.

4. An electrochromic assembly as in claim 1, where the epoxy formulation comprises filler taken from a group comprising carbon black, fumed silica, colorants, inorganic fillers and oxygen scavengers.

5. An electrochromic assembly as in claim 1, wherein the said epoxy resin is cured by an anhydride curing agent.

6. An electrochromic assembly as in claim 1, wherein the said sealant further comprises a prehydrolyzed silane.

7. An electrochromic mirror assembly, comprising a rear element and a transparent front element bonded together by an epoxy sealant cured with an anhydride curing agent and containing an inorganic filler in an amount greater than 35% by weight of the sealant, wherein the said front and the rear elements are arranged in a spaced apart relationship to define a chamber, and an electrochromic material contained in the said chamber, and the glass transition temperature of the cured sealant being in excess of 120° C.

8. An electrooptic assembly, comprising a rear element and a transparent front element bonded together by an epoxy sealant in a spaced apart relationship to define a chamber, and an electrooptic material contained in the said chamber, the said sealant comprising a prehydrolyzed silane.

9. An electrooptic assembly as set forth in claim 8 where the said assembly is an electrochromic mirror.

10. An electrochromic assembly, comprising a rear element and a transparent front element bonded together by a sealant in a spaced apart relationship to define a chamber, and an electrochromic material contained in the said chamber, the said sealant comprising at least one of (a) crystalline nano-particles of inorganic materials and (b) silsesquioxanes.

11. An electrochromic mirror assembly, comprising a rear element and a transparent front element bonded together by a sealant in a spaced apart relationship to define a chamber, and an electrochromic material contained in the said chamber, the said sealant comprises (a) an epoxy resin sealant with a functionality greater than 2, (b) is cured by an anhydride curing agent and (c) contains an inorganic filler in an amount at least 35% by weight.

* * * * *